United States Patent
Pope et al.

(10) Patent No.: US 11,190,924 B2
(45) Date of Patent: Nov. 30, 2021

(54) TRACKING DEVICE FOR A TRACK AND LOCATE SYSTEM

(71) Applicant: In-Tech Enterprise, Ltd., Kowloon (HK)

(72) Inventors: Gordon Christopher Pope, The Peak (HK); Wing Hung Cheung, Kowloon Tong (HK); Ka King To, Chai Wan (HK)

(73) Assignee: IN-TECH ENTERPRISE LTD., Kowloon (HK)

( * ) Notice: Subject to any disclaimer, the term of this patent is extended or adjusted under 35 U.S.C. 154(b) by 0 days.

(21) Appl. No.: 16/674,718

(22) Filed: Nov. 5, 2019

(65) Prior Publication Data
US 2021/0136553 A1    May 6, 2021

(51) Int. Cl.
| | | |
|---|---|---|
| *H04W 4/00* | (2018.01) | |
| *H04W 4/90* | (2018.01) | |
| *H04W 4/029* | (2018.01) | |
| *G01S 1/04* | (2006.01) | |
| *G08B 25/01* | (2006.01) | |
| *G08B 25/10* | (2006.01) | |
| *H04W 76/50* | (2018.01) | |

(52) U.S. Cl.
CPC ............. *H04W 4/90* (2018.02); *G01S 1/0428* (2019.08); *G08B 25/016* (2013.01); *G08B 25/10* (2013.01); *H04W 4/029* (2018.02); *H04W 76/50* (2018.02)

(58) Field of Classification Search
CPC ......... H04W 88/06; H04W 4/80; H04W 4/90; H04W 4/029; H04W 76/50
See application file for complete search history.

(56) References Cited

U.S. PATENT DOCUMENTS

| | | | |
|---|---|---|---|
| 6,222,484 B1 | 4/2001 | Seiple et al. | |
| 6,961,555 B1 * | 11/2005 | Philyaw | G06F 16/955 |
| | | | 455/403 |
| 8,818,351 B1 | 8/2014 | Crossno et al. | |

(Continued)

OTHER PUBLICATIONS

Emergency position-indicating radiobeacon—Wikipedia, Oct. 23, 2019 (Oct. 23, 2019) XP055784087, Retrieved from the Internet: URL:https://en.wikipedia.org/w/index.php?title=Emergency_position-indicating_radiobeacon&oldid=922638095 [retrieved on Mar. 10, 2021].

(Continued)

*Primary Examiner* — Omoniyi Obayanju
(74) *Attorney, Agent, or Firm* — Haynes and Boone, LLP

(57) ABSTRACT

A tracking device for a track and rescue system that wirelessly couples to a control system via a first link established between a control system first type wireless communication interface coupled to the control system and a tracking device first type wireless communication interface included in the tracking device when the tracking device first type wireless communication interface is within range of the control system first type wireless communication interface. The tracking device determines that a first predetermine time period has been satisfied, and in response, determines location information for the tracking device using the positioning system. The tracking device sends, in response to the first predetermined time period being satisfied, an alive signal to the control system via the first link, and the alive signal includes the location information.

14 Claims, 15 Drawing Sheets

(56) References Cited

U.S. PATENT DOCUMENTS

| | | |
|---|---|---|
| 8,886,215 B1 | 11/2014 | Crossno et al. |
| 8,886,216 B1 | 11/2014 | Crossno et al. |
| 10,462,611 B1 | 10/2019 | Klinkner et al. |
| 10,575,138 B1 | 2/2020 | Klinkner et al. |
| 10,645,534 B1 | 5/2020 | Klinkner et al. |
| 2004/0000994 A1 | 1/2004 | Kuo |
| 2007/0124062 A1* | 5/2007 | Janky ............... G01S 5/0027 701/468 |
| 2012/0286950 A1* | 11/2012 | Peariso ............. G08B 13/1427 340/539.1 |
| 2013/0099920 A1 | 4/2013 | Song et al. |
| 2016/0029340 A1 | 1/2016 | Woodcock |
| 2017/0126678 A1 | 5/2017 | Kang |
| 2017/0197583 A1* | 7/2017 | Izraeli ................ H04W 4/029 |
| 2017/0278061 A1 | 9/2017 | Skaaksrud |
| 2017/0352250 A1 | 12/2017 | Chapiewski et al. |
| 2018/0141627 A1 | 5/2018 | Schot |
| 2019/0342710 A1 | 11/2019 | Vega et al. |
| 2020/0033128 A1 | 1/2020 | Baratz et al. |
| 2020/0204951 A1 | 6/2020 | Chapiewski et al. |

OTHER PUBLICATIONS

Extended Search Report, European Patent Application No. 20205861. 6, 12 pages.

* cited by examiner

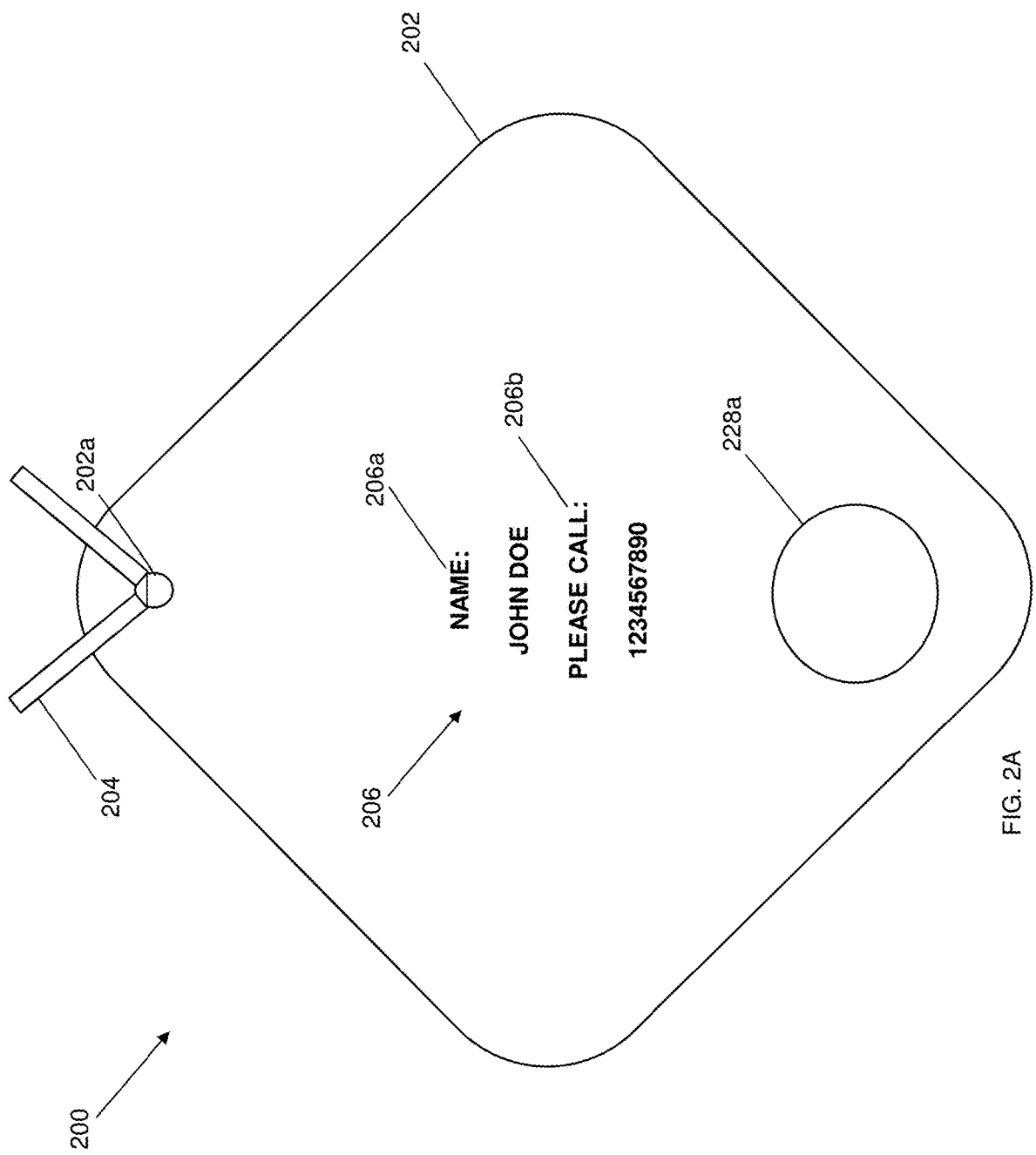

| Sequence No. | SUBJECT INFORMATION | Pendant S/N No. | Lora signal Receive record | Lora signal Missed record | Tacking Device Status | Location Information |
|---|---|---|---|---|---|---|
| 001 | Subject 112a | TD102a | T0, T1, Tn | T2 | Safe | L0, L1, L2 |
| 002 | Subject 112b | TD102b | T0, T1, | Tn | Lost | L3, L4 |
| ... | ... | | | | | |
| 00n | Subject 112n | TD102n | T0, T1, T2, Tn | | Emergency | L5, L6, L7, L8 |
| ... | ... | | | | | |

FIG. 9

TRACKING DEVICE FOR A TRACK AND LOCATE SYSTEM

CROSS REFERENCE TO RELATED APPLICATIONS

This application is related to U.S. Utility application Ser. No. 16/674,685, filed Nov. 5, 2019, the disclosure of which is incorporated herein by reference in its entirety. This application is also related to U.S. Utility application Ser. No. 16/674,732, filed Nov. 5, 2019, the disclosure of which is incorporated herein by reference in its entirety.

FIELD OF THE DISCLOSURE

This disclosure relates generally track and locate system and, more particularly, locating a tracking device that is out of communication range with a control system provided in a track and locate system.

BACKGROUND

Tracking of people, objects, and animals is useful in many scenarios. For example, animals may be tracked to determine migratory patterns, determine location of domestic animals such as pets and livestock, and/or other uses. In other examples, fleets of vehicles and containers may be tracked to verify location, determine whether any unscrupulous activity has occurred, and the like. Also, people may be tracked to determine shopping habits, to record and report suspicious activity, ensuring a house arrest sentence is maintained, and the like. Tracking may be performed by a variety of technologies such as using video vision of a scene, attaching a tracking device that provides a detectable radio frequency to a collar, and embedding the tracking device on or within an object or biological entity, among other tracking technologies.

SUMMARY

According to one embodiment, a tracking device for a track and rescue system, includes: a communication system that includes a tracking device first type wireless communication interface; a positioning system; a processing system that is coupled to the communication system and the positioning system; and a memory system that is coupled to the processing system and that includes instructions that, when executed by the processing system, cause the processing system to provide a tracking engine that is configured to: wirelessly couple to a control system via a first link established between a control system first type wireless communication interface coupled to the control system and the tracking device first type wireless communication interface when the tracking device first type wireless communication interface is within range of the control system first type wireless communication interface; determine that a first predetermine time period has been satisfied, and in response, determine location information for the tracking device using the positioning system; and send, in response to the first predetermined time period being satisfied, an alive signal to the control system via the first link, wherein the alive signal includes the location information.

According to one embodiment, a method of track and locate, includes: wirelessly coupling, by a tracking device, to a control system via a first link established between a control system first type wireless communication interface coupled to the control system and a tracking device first type wireless communication interface included on the tracking device when the tracking device first type wireless communication interface is within range of the control system first type wireless communication interface; determining, by the tracking device, that a first predetermine time period has been satisfied, and in response, determining location information for the tracking device using a positioning system; and sending, by the tracking device and in response to the first predetermined time period being satisfied, an alive signal to the control system via the first link, wherein the alive signal includes the location information.

According to one embodiment, A non-transitory computer-readable medium having stored thereon machine-readable instructions that, when executed by a machine, cause the machine to perform operations includes: wirelessly coupling to a control system via a first link established between a control system first type wireless communication interface coupled to the control system and a tracking device first type wireless communication interface included on a tracking device when the tracking device first type wireless communication interface is within range of the control system first type wireless communication interface; determining that a first predetermine time period has been satisfied, and in response, determining location information for the tracking device using a positioning system; and sending, in response to the first predetermined time period being satisfied, an alive signal to the control system via the first link, wherein the alive signal includes the location information.

BRIEF DESCRIPTION OF THE DRAWINGS

FIG. 2A is a perspective view illustrating an embodiment of a tracking device that may be provided in the track and locate system of FIG. 1.

FIG. 9 is a tracking device table that includes tracking device profiles stored by the control system used in the track and locate system of FIG. 1.

Figure 1:
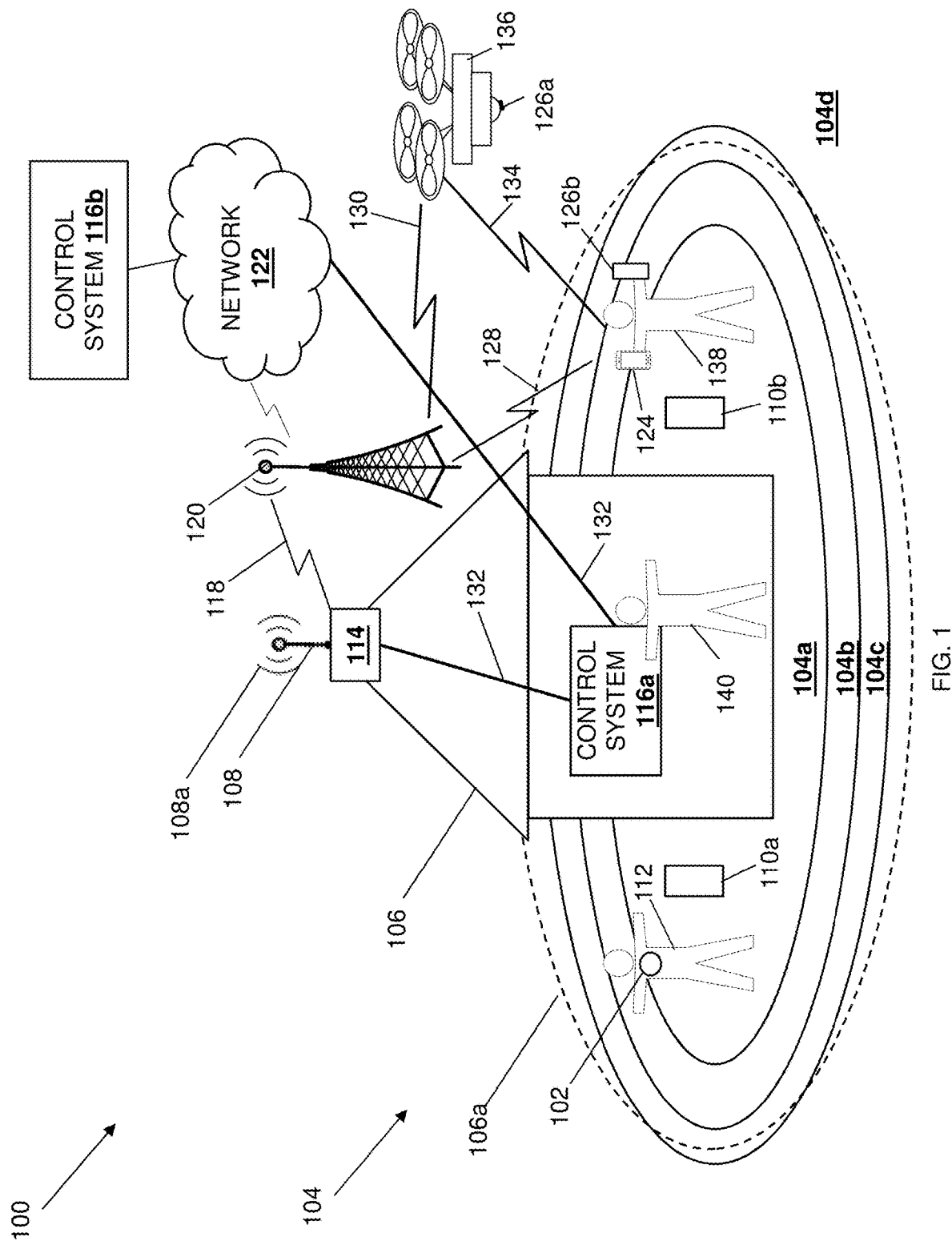
FIG. 1 is a schematic view illustrating an embodiment of a track and locate system.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The systems and methods of the present disclosure provide for a track and locate system where a tracking device is associated with a subject (e.g., a person, an animal, an object, etc.) The tracking device is wirelessly linked to a control system that defines a plurality of zones in a physical environment. The tracking device provides location information via the wireless link to the control system as the subject moves in the physical environment. The control system provides tracking device instructions to the tracking device and performs other instructions based on which zone the tracking device is located. The tracking device may also provide emergency signals to the control system via the wireless link when the tracking device detects an emergency condition via user inputs or sensors provided on the tracking device. The control system may perform instructions and provide tracking device instructions to the tracking device based on the emergency signal. If the control system detects that the wireless link with the tracking device is lost, the control system will transmit a notification to a receiver device that the tracking device is lost. The notification may include the last known location and any prior locations of the tracking device. A rescuer or a vehicular may move the receiver device to the last known location to determine whether the receiver device can detect and locate the tracking device.

When the tracking device detects that the wireless link is lost, the tracking device enters a lost mode. In lost mode, the tracking device may begin transmitting a beacon signal that provides a relatively higher allowable transmit power, a relatively longer transmit duration and/or an ability to stay on a fixed frequency for a longer duration when compared to the wireless signals used over the wireless link between the control system and the tracking device. Also, in lost mode, the tracking device may continue to periodically transmit the alive signal that may include location information gathered by the tracking device. In lost mode, the tracking device may disable emergency sensors and other non-essential components included on the tracking device to conserver power. Lost mode may also activate a backup power supply that is only used in lost mode to extend the maximum possible operating time of the tracking device during lost mode.

The receiver device that is dispatched with the rescuer may include a directional antenna that is configured to detect the beacon signal provided by the tracking device while the tracking device is in lost mode. The receiver device may collaborate with other receiver devices that are dispatched to search for the tracking device. The rescuer or vehicular device associated with the receiver device may begin searching for the tracking device at the last known location of the tracking device. The rescuer may begin moving about the environment trying to detect the beacon signal or the alive signal being transmitted by the tracking device. When the receiver device detects the beacon signal, the receiver device may determine a direction from which the beacon signal originated. The direction may be determined by the signal strength of the beacon signal and/or location information (e.g., GPS information) provided in the beacon signal. The receiver device may transmit the location of the receiver device and the direction of the beacon signal to other receiver devices coordinating with the receiver device. The receiver device may receive locations of the other receiver devices and directional information about the beacons signals that those receiver devices detected. The receiver device may determine an approximate location of the tracking device using this information. The rescuer may move the receiver device toward the identified location of the tracking device.

When in range of the alive signal transmitted by the tracking device, the receiver device may receive an alive signal from the tracking device, which may include location information of the tracking device obtained by the tracking device. The receiver device may send an acknowledgement to the tracking device and establish a wireless link. The receiver device may provide tracking device instructions to the tracking device and/or the tracking device may include instructions that causes the tracking device to operate in a receiver mode when a wireless link with a receiver device is formed. For example, the tracking device may turn off the beacon signal. However, if the tracking device cannot determine its own location information using its positioning system, then the tracking device may continue to transmit the beacon signal. The rescuer, using the rescue device, may continue to proceed toward the tracking device until the subject and the tracking device is found. Thus, the track and locate system of the present disclosure provides benefits of conserving battery power of a tracking device while providing a method of quickly locating the tracking device within a physical environment when the subject associated with the tracking device is lost. The systems and methods of the present disclosure extend the range of the tracking device while the tracking device and a control system is able to exchange information and instructions.

Referring now to FIG. 1, an embodiment of a track and locate system 100 is illustrated. In the illustrated embodiment, the track and locate system 100 includes a tracking device 102 provided in a physical environment 104. The tracking device 102 may be any mobile device, wearable device, implantable device, and/or any other device that can be tracked, as discussed in more detail below.

The physical environment 104 may be any indoor and/or outside space that may be contiguous or non-contiguous. The physical environment 104 may be defined by geofencing techniques that may include specific geographic coordinates such as latitude, longitude, and/or altitude, and/or operate within a range defined by a wireless communication signal. The physical environment 104 may include one or more zones. For example, in the illustrated embodiment, the physical environment 104 may include a zone 104a, a zone 104b, a zone 104c, and/or a zone 104d. Each zone 104a-104d may be any indoor and/or outdoor space that may be contiguous or non-contiguous in the physical environment 104. Each zone 104a-104d may be defined by geofencing techniques that may include specific geographic coordinates such as latitude, longitude, and/or altitude, and/or operate within a range defined by a wireless communication signal. Also, while each zone 104a-104d is illustrated as an area, each zone 104a-104d may include a volume. Furthermore, each zone may be dynamic such that each zone remains coordinated with the physical environment 104 as the physical environment changes. For example, a ship may be the physical environment 104, which changes in geographic coordinates as it traverses a body of water. Each zone 104a-104d may remain constant in relation to the ship, which results in the geographic coordinates of each zone 104a-104d changing in coordination with the geographic coordinates of the physical environment 104 as the geographic coordinates of the physical environment 104 changes. In other examples, each zone 104a-104d may dynamic such that one or more of each zone 104a-104d changes as a function of time (e.g., the geographic coordinates of the zone 104a may change based on time, exists only at certain time periods, and/or other conditions). In various embodiments, each zone 104a-104d may be associated with a classification such as a safety zone, an authorized zone, an expected zone where the tracking device 102 is supposed to be located, a warning zone, a danger zone, an unauthorized zone, a lost zone, and/or any other classification that would be apparent to one of skill in the art in possession of the present disclosure. Each classification and/or zone 104a-104d may be associated with one or more conditions and instructions for the track and locate system 100 when those conditions are met.

In the illustrated example and as discussed herein, the physical environment 104 may include a nursing home facility 106 and the area within a coverage area 106a around the nursing home facility 106. The coverage area 106a around the nursing home facility 106 may be defined by physical geographical coordinates or a wireless communication signal range of a wireless communication signal 108a provided by an antenna 108 and one or more repeaters 110a and 110b (e.g., gateways) of the wireless communication signal 108a. The physical environment 104 may include an area that is outside of the coverage area 106a as well. Each zone 104a-104d, as illustrated, may be defined as a concentric circle radiating from a central location. However, as discussed above, the zones 104a-104d may be any defined area/volume within the physical environment 104. While a nursing home facility 106 and the area/volume within the coverage area 106a are described as the physical environment 104, one of skill in the art in possession of the present disclosure will recognize that other indoor and/or outdoor spaces may benefit from the teachings of the present disclosure. For example, the physical environment may include a domicile and all or a portion of property around that domicile, a zoo including outbuildings, a prison, a school ground, a farm, a shipping yard, a ship or other vehicle, a ski resort, and/or any other physical environment that would be apparent to one of skill in the art in possession of the present disclosure.

In various embodiments, the track and locate system 100 includes the tracking device 102. The tracking device 102 may be associated with a subject 112. The subject 112 may be a person (an elderly person, a person with a mental disability, a child, an employee, a prisoner, a person lacking agency, and/or other person that would be apparent to one of skill in the art in possession of the present disclosure), an animal (e.g., a cow, a horse, a bird, a rhino, a dog, and/or any other animal that would be apparent to one of skill in the art in possession of the present disclosure), an object (e.g., a container, an autonomous vehicle, a non-autonomous vehicle, equipment, furniture, and/or any other object that would be apparent to one of skill in the art in possession of the present disclosure), and/or any other subject that would be apparent to one of skill in the art in possession of the present disclosure.

In various embodiments, the tracking device 102 may be in communication, directly or indirectly with a gateway 114. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events. The gateway 114 may include a first communication interface that communicates with the tracking device 102 while within the coverage area 106a. The first communication interface may include one or more radio transceivers (e.g., that include the antenna 108) along with associated logic, circuitry, interfaces, memory, and/or code that enable communications, (e.g. with the tracking device 102, via wireless interfaces and using the radio transceivers). The antenna 108 may be contained within a housing of the gateway 114 (e.g., included within the housing and/or circuitry of a gateway), or disposed (e.g., mounted) inside or outside a housing of the nursing home facility 106. The antenna 108 may be coupled to a gateway 114 that is configured to communicate, via the antenna 108. The antenna 108 may be configured with a communication signal that includes a communication protocol that preferably provides a non-licensed frequency band to allow a hassle free deployment by general public, that provides minimal number of equipment required to service a relatively wide area (e.g., in terms of miles), that consumes low power when transmission is not taking place, and/or a low system cost for a high quantity of tracking devices. For example, the antenna 108 may preferably correspond to a spread spectrum communication standard such as, for example, Long Range (LoRa) modulation. However, one of skill in the art in possession of the present disclosure will recognize that other wireless standards, such as the Institute of Electrical and Electronics Engineers (IEEE) 802.11 standard, a Bluetooth® standard, a ZigBee® standard, a Z-Wave® standard, and/or other wireless standards, cellular standards, such as 3G, 4G, 4G LTE, 5G, and/or other cellular standards, infrared-based communication, optical-based communications, and/or other appropriate communication standards and/or protocols that create the coverage area 106a. In various embodiments, the tracking device 102 may be in communication with the gateway 114 via repeaters 110a and/or 110b that may extend the range of the antenna 108 and assist in providing the coverage area 106a if the communication standard selected and antenna capabilities are not suitable by themselves to provide the desired coverage area 106a. In some examples, the repeaters 110a and 110b may be gateways in addition to a gateway 114, discussed below. Since there may be overlapping areas served by multiple gateways and hence the alive signal of the tracking device 102 may be picked up by more than gateway and passed to a control system 116. The control system 116 will choose which gateway to listen to and discard any redundant information In various embodiments, the gateway 114 may be configured to communicate with a local control system 116a, a remote control system 116b, a user device 124, a receiver device 126a, and a receiver device 126b. As described herein, the local control system 116a and the remote control system 116b may be referred to as control system 116 and the functionality of the control system 116 may be performed solely by the local control system 116a, solely by the remote control system 116b or distributed between the local control system 116a and the remote control system 116b. The gateway 114 may include a converter controller or other associated logic, circuitry, interfaces, memory, and/or code that is configured to convert communications received by the first communication interface that includes the antenna 108 that communicates with the tracking device 102 to another communication standard such that those communications that can be provided to the control system 116 via a second communication interface. Similarly, the converter controller may convert communications received at the second communication interface from the control system 116, the user device 124, the receiver device 126a, the receiver device 126b, and/or any other device in the track and locate system 100 to the communication standard used by the first communication interface that includes the antenna 108. The second communication interface may include one or more radio transceivers (e.g., that include antennas) along with associated logic, circuitry, interfaces, memory, and/or code that enable communications, e.g. with a base station 120, via wireless interfaces and using the radio transceivers. For example, the gateway 114 is in communication with the control system 116 via a cellular connection 118 of a network 122 (e.g., a radio access network (RAN) (e.g., 3G, 4G, 5G, and/or other 3GPP-based RAN)) serviced by the base station 120). In FIG. 1, the radio transceivers of the gateway 114 may include an antenna other than the antenna 108, which may be utilized to radiate and/or receive power to communicate on the network 122. The other antenna may be contained within a housing of the gateway 114 (e.g., included within the housing and/or circuitry of the gateway 114), or disposed (e.g., mounted) inside or outside a housing of the gateway 114 and/or the nursing home facility 106. The other antenna may correspond to a cellular technology (e.g., using LTE or other cellular technology communication signal), which uses a coverage area of the RAN.

In other examples, the second communication interface and/or an additional communication interface may be included on the gateway 114 to wirelessly communicate with the user device 124, the receiver device 126a, the receiver device 126b, the control system 116 and/or any other device in the track and locate system 100 using wireless standards, such as the Institute of Electrical and Electronics Engineers (IEEE) 802.11 standard, Bluetooth® standard, ZigBee® standard, Z-Wave® standard, and/or other wireless standards, infrared-based communication, optical-based communications, and/or other appropriate communication standards and/or protocols that create a local wireless network. In some cases, the gateway 114 may be configured to communicate with another device using a proprietary wireless communication protocol and interface. In some cases, the gateway 114 may be configured to interface with a wired network, such as via an Ethernet interface, power-line modem, DSL modem, PSTN modem, cable modem, and/or other appropriate components for wired communication to the local control system 116a and/or the network 122. Alternatively or in addition, the gateway 114 may support proprietary wired communication protocols and interfaces. As such gateway 114 may be configured to communicate over a wired link 132 (e.g., through a network router, switch, hub, or other network device) for purposes of wired communication.

In various embodiments, other devices in the track and locate system 100 may directly or indirectly communicate with each other. For example, the user device 124 may communicate directly or indirectly with the receiver device 126b, the receiver device 126a via a wireless link 134, the control system 116 via a local area network and/or via a wide area network provided by the network 122. The user device 124 may utilize one or more of the communication standards and communication interfaces discussed above with respect to the gateway 114 to provide these communications. Similarly, the control system 116 may communicate directly or indirectly with the receiver device 126a and the receiver device 126b via a local area network and/or via a wide area network provided by the network 122. Also, the receiver devices 126a and 126b may communicate directly or indirectly with each other via the local area network and/or via the wide area network provided by the network 122.

In the illustrated example, the control system 116 is located in the physical environment 104 at the nursing home facility 106 and is coupled to the gateway 114 via a WiFi connection and/or an Ethernet connection. The control system 116 may be monitored by an operator 140. However, in other examples, the control system 116 may be provided, in part, in addition to or in whole, remotely via the network 122. For example, the control system 116 may include one or more server devices, storage systems, cloud computing systems, and/or other computing devices (e.g., desktop computing device(s), laptop/notebook computing device(s), tablet computing device(s), mobile phone(s), etc.). One of skill in the art in possession of the present disclosure will recognize that the gateway 114 may communicate with the control system 116 that is remote to the nursing home facility via a wired connection or a combination of wireless and wired connections as well. In yet other embodiments, the gateway 114 may be provided in the control system 116.

In various embodiments, the receiver device 126a may be incorporated into a vehicular device 136 such as an unmanned aerial vehicle (UAV), an airplane, a car, a truck, a bus, a train, a submersible, a boat, a tractor, a personal transportation device, a construction vehicles, a snowmobile, and/or any unmanned or manned vehicular device that would be apparent to one of skill in the art in possession of the present disclosure. The receiver device 126a may be built into the vehicular device 136 and receive power from the vehicular device. However, in other embodiments, the receiver device 126a may be swappable such that it may be removed from the vehicular device 136 and installed into another vehicular device or used as a handheld device by a rescuer 138. In other embodiments, the receiver device 126a may not be built into or provided in the vehicular device 136 at all and may be a standalone device that includes its own power supply such as the receiver device 126b and manually moved by the rescuer 138. The receiver devices 126a and 126b may be configured to create a localized coverage area within the track and locate system 100 to detect one or more communication transmission standards provided by the tracking device 102 and communicate between each other, other receiver devices, the user device 124, and/or the control system 116.

The user device 124 may be, and/or may include, a mobile phone, a personal digital assistant (PDA), a tablet device, a computer, or generally any device that is operable to communicate wirelessly (e.g., via wireless standards using antennas) with the control system 116, the receiver device 126a, the receiver device 126b, in some instances the tracking device 102, and/or any other device in the track and locate system 100.

The base station 120 may include, may be a component of, and/or may be referred to as, a cell, a base node, a Node B (NB), an eNode B (eNB), gNodeB (gNB), or a Home eNB (HeNB). The base station 120 includes suitable logic, circuitry, interfaces, memory, and/or code that enable communications, e.g. with the gateway 114, the control system 116, the user device 124, the receiver devices 126a-126b, another base station, and/or the network 122, via wireless interfaces utilizing one or more radio transceivers (e.g., that include antennas). In some cases, the base station 120 may be mobile (e.g., mobile base stations at ground level, mobile base stations at flight altitudes, mobile naval-based base stations, etc.), in which case its position information is dynamic. The base station 120 may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. The coverage area of a base station may be different in different environments, at different altitudes, and at different frequency bands. When altitudes are taken into consideration, the coverage area provided by the base station 120 may more appropriately be referred to as a coverage volume, with different coverage areas at different altitudes. As used herein, the coverage area and coverage volume may be referred to more generally as a coverage region, where the region may be two-dimensional (e.g., coverage area) or three-dimensional (e.g., coverage volume).

The network 122 may facilitate communications between devices within the track and locate system 100 and include a local area network, an ad hoc network, and/or a wide area network such as the Internet, and or other networks that would be apparent to one of skill in the art in possession of the present disclosure. While a track and locate system 100 has been illustrated and described, one of skill in the art in possession of the present disclosure will recognize that the teachings of the present disclosure will be beneficial for a variety of track and locate systems and, as such, a wide variety of modifications to the number, types, and orientation of devices in the track and locate system 100 will fall within the scope of the present disclosure as well.

Figure 2B:
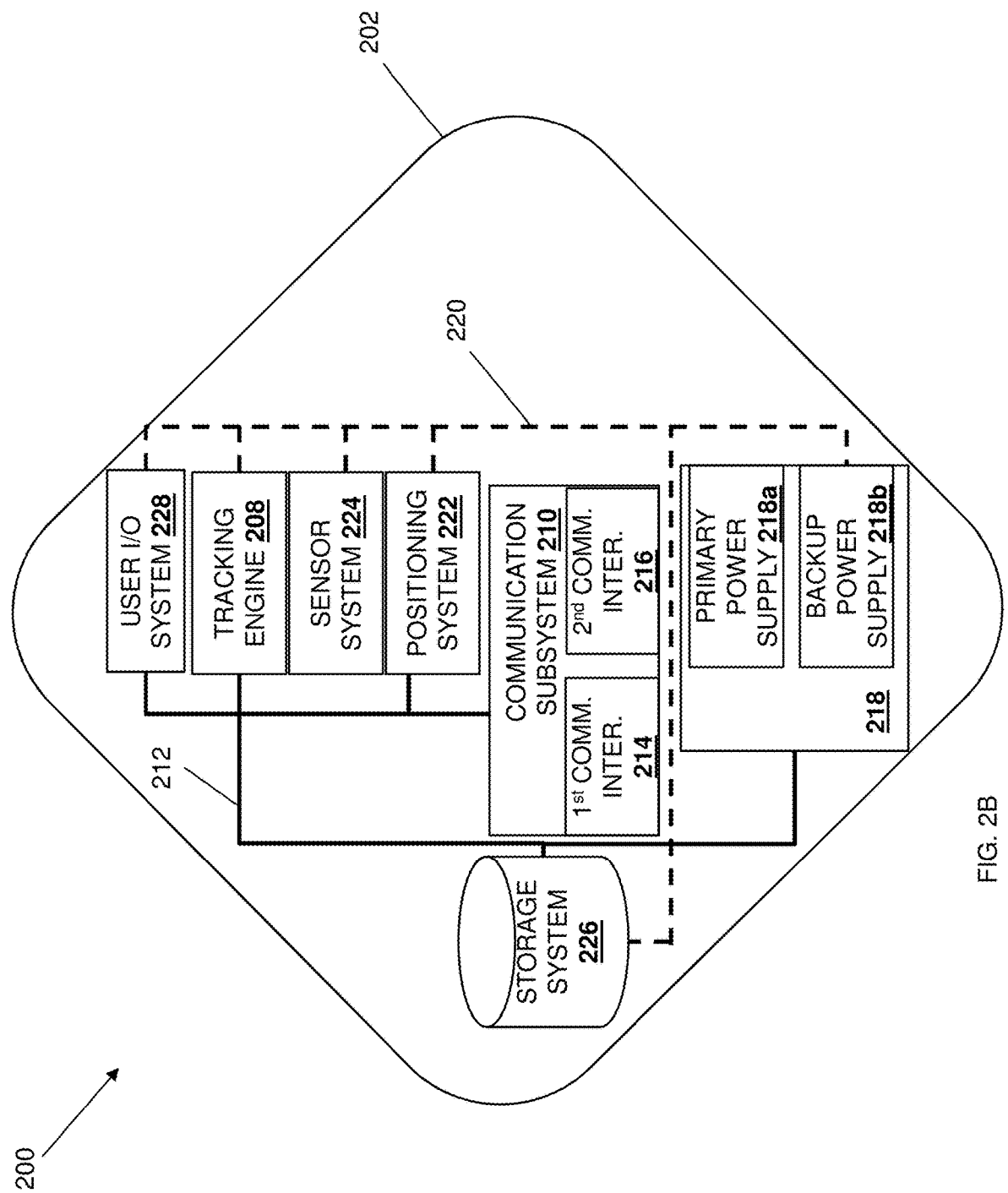
FIG. 2B is a schematic view illustrating an embodiment of the tracking device of FIG. 2A.

Referring now to FIGS. 2A and 2B, and embodiment of a tracking device 200 is illustrated that may be the tracking device 102 discussed above with reference to FIG. 1. In the illustrated embodiment, the tracking device 200 includes a chassis 202 and is a pendant that may be worn by the subject 112. However, as discussed above, the tracking device 200 may be any wearable device, an implantable device, and/or a mobile device that would be apparent to one of skill in the art in possession of the present disclosure. Because the tracking device 200 is a pendant, the chassis 202 may define an aperture 202a through which a wearable coupling feature 204 such as, for example, a necklace, a ribbon, a string, a chain, and/or other wearable coupling feature for attaching the tracking device 200 to the subject 112 that would be apparent to one of skill in the art in possession of the present disclosure. In various embodiments, the chassis 202 may include information 206 such as identification information 206a and contact information 206b that is defined by the chassis 202 and/or coupled to the chassis 202. In the illustrated example, an identifier of the subject 112 is provided in the identification information 206a and an emergency number to contact is provided in the contact information 206b. While specific information is illustrated, one of skill in the art in possession of the present disclosure will recognize that other information (e.g., Serial Number of the tracking device 200, medical information, etc.) may be provided in the information 206, without departing from the scope of the present disclosure.

In an embodiment, the chassis 202 houses the components of the tracking device 200. Several of these components are illustrated in FIG. 2B. For example, the chassis 202 may house a processing system (not illustrated) and a non-transitory memory system (not illustrated) that includes instructions that, when executed by the processing system, cause the processing system to provide a tracking engine 208 that is configured to perform the functions of the tracking engines and/or the tracking devices discussed below.

The chassis 202 may further house a communication subsystem 210 that is coupled to the tracking engine 208 (e.g., via a communication coupling 212 (e.g., a communication bus, trace, etc.) between the communication subsystem 210 and the processing system). The communication subsystem 210 may include software or instructions that are stored on a computer-readable medium and that allow the tracking device 200 to send and receive information through the communication networks described herein. For example, the communication subsystem 210 may include a communication interface 214 (e.g., primary transceiver(s)) to provide for communications through the communication network provided by the antenna 108 (e.g., a LoRa network), as detailed above. In an embodiment, the communication interface 214 may include a wireless antenna that is configured to provide LoRa modulations or other wireless communications described above. The communication subsystem 210 may also include a communication interface 216 (e.g., a backup transceiver(s)) that is configured to transmit a signal (e.g., a beacon signal) that may provide a relatively longer range than that of the signal provided by the communication interface 214. The signal provided by the communication interface 216 may be selected to use relatively less power than the communication interface 214 when transmitted more frequently than the signal provided by the communication interface 214. However, with reduced power for increased range and more frequent transmissions, less information may be available in the signal provided by the communication interface 216 relative to the communication interface 214. In other examples the communication interface 216 may transmit a beacon signal at a high allowable transmit power relative to the communication interface 214, transmit a beacon signal for a long duration with relative to the communication interface 214, and/or stay on a fixed frequency for a long duration relative to the communication interface 214.

The communication interface 216 may be configured to operate according to wireless protocols such as, for example, wide band Frequency Shift Keying (FSK) signaling, narrow band FSK signaling, or other wireless protocols that may be apparent to one of skill in the art. For example, the tracking device 202 may be configured to be plug and play upon purchase and so licensed frequency bands may be avoided in the communication interfaces 214 and 216. For unlicensed frequency bands, telecom governing authorities (e.g. FCC in US) may impose restrictions on the product behavior so as to accommodate the maximum number of devices into the limited bandwidth. For example, the transmit power is limited; the number of times of transmission per time period is limited; the amount of time to transmit on a particular frequency channel is limited, etc. These restrictions are not favorable factors for a beacon signal provided by the communication interface 216. As a result the beacon signal provided by the communication interface 216 does not necessarily provide longer range or higher energy efficiency than a signal provided by the communication interface 214 (e.g., an alive signal provided by LoRa modulation) under the constraints stated above, but in some instance may provide a longer range or higher energy efficiency. General preferred requirements of the communication protocol that provides the beacon signal provided by the communication interface 216 may include: a high allowable transmit power, a transmit duration as long as possible, and/or the ability to stay on a fixed frequency as long as possible.

On the other hand, the alive signal provided by the communication interface 214 may operate in the unlicensed band too and follows the regulations of the governing authorities. However, the communication interface 214 may avoid prolonged transmission at the same channel by frequency hopping techniques (e.g. LoRa). Due to the inherent characteristics of LoRa signal, it has a better range than other common radio protocols for the unlicensed bands. LoRa is generally not good for radio direction finding due to its inherent frequency hopping nature. Thus, when location information is absent from LoRa, the LoRa signal is virtually useless. Through the combination of alive signal and beacon signal regardless of the presence of GPS information during lost mode, the chance of finding the lost subject 112 is increased.

The chassis 202 also houses a power supply system 218 that may include and/or be configured to couple to a primary power supply 218a and, in some embodiments, a backup power supply 218b. For example, the primary power supply 218a and/or the backup power supply 218b may include an integrated rechargeable battery that may be recharged in the chassis 202 using methods known in the art, and/or may include other power sources that would be apparent to one of skill in the art in possession of the present disclosure. In some embodiments, the user device 124 discussed above with reference to FIG. 1 may be configured to couple to the chassis 202 (e.g., via a port system that includes a power port) that may provide for the recharging of a rechargeable battery included in the power supply system 218. In other examples, the power port may be coupled to any other external power supply such as a wall outlet, a charging device that is coupled to a wall outlet, provide an induction device that wirelessly receives power from another induction device, or any other power supply that would be apparent to one of skill in the art in possession of the present disclosure. In various embodiments, port systems may include a data port configured to communicate data between the tracking device 200 and the user device 124 (e.g., via a cable or other connector). In other embodiments, the primary power supply 218a and/or the backup power supply 218b may be configured to accept a replaceable, non-rechargeable battery while remaining within the scope of the present disclosure as well. The power supply system 218 may be coupled to a power bus 220 that is coupled to the processing system, the memory system, the communication subsystem 210, a storage system 226, a sensor system 224, a positioning system 222, a user input/output (I/O) system 228, and/or other components included in the chassis 202.

In a specific example, the primary power supply 218a may include a rechargeable battery which can be recharged on periodic basis. The voltage and the number of charging cycles may be monitored to assess the remaining usable life span. The backup power supply 218b may include a high shelf life non-rechargeable battery. The backup power supply may be the last resort if the rechargeable battery is approaching depletion. The advantage of using non-chargeable battery as backup may include minimal self-discharge and hence no deterioration of capacity under prolonged idle state and life span of rechargeable battery is reduced upon every charge and discharge cycle or under prolonged idle state.

In various embodiments, the chassis 202 may also include the positioning system 222 that is coupled to the tracking engine 208 (e.g., via the coupling 212 between the processing system and the positioning system 222). The positioning system 222 may include sensors that are configured to determine their current location and position. For example, the positioning system 222 may include a global positioning system (GPS) receiver, a real-time kinematic (RTK) GPS receiver, a differential GPS receiver, a Wi-Fi based positioning system (WPS) receiver, and/or a variety of other positioning systems and components that would be apparent to one of skill in the art in possession of the present disclosure. In various embodiments, the chassis 202 may include a sensor system 224 that is coupled to the tracking engine 208 (e.g., via the coupling 212 between the processing system and the sensor system 224), and configured to provide for the monitoring of conditions of the subject 112, the tracking device 102, and/or conditions of the physical environment 104 around the subject 112/tracking device 102 such as, for example, biometric sensors (e.g., a heart rate monitor, a blood pressure sensor, a pH sensor, a temperature sensor) and/or any other biometric sensor that would be apparent to one of skill in the art in possession of the present disclosure when the subject 112 is an animal or human, a motion sensor such as, for example, an orientation sensor (e.g., a gyroscope), an accelerometer, and other motion sensors that would be apparent to one of skill in the art in possession of the present disclosure, environmental sensors such as, for example, temperature sensors, humidity sensors, pressure sensors, tracking device sensors such as component temperature sensors, power sensors, and/or any other tracking device sensor for monitoring the tracking device 102 that would be apparent to one of skill in the art, and/or any other sensor that would be apparent to one of skill in the art in possession of the present disclosure.

The chassis 202 may also house a storage system 226 that is coupled to the tracking engine 208 (e.g., via the coupling 212 between the processing system and the storage system 226). The storage system 226 may store sensor information, tracking device instructions for the tracking engine 208, subject information associated with the subject 112, and/or other information and instructions that would be apparent to one of skill in the art in possession of the present disclosure. The chassis 202 may also house the user I/O system 228 that is coupled to the tracking engine 208 (e.g., via the coupling 212 between the processing system and the user I/O system 228). In an embodiment, the user I/O system 228 may include a user input subsystem that may be provided by a keyboard input subsystem, a mouse input subsystem, a track pad input subsystem, a touch input display subsystem, a microphone, and/or any other user input system that would be apparent to one of skill in the art in possession of the present disclosure. In a specific example, an emergency button 228a is included in the user I/O system 228 that triggers an emergency mode when activated by the subject 112. In some embodiments, the user I/O system 228 may optionally include an output subsystem such as, for example, a haptic feedback device, a speaker, a display subsystem, a light (e.g., a light emitting diode (LED)), and/or any other user output subsystem that would be apparent to one of skill in the art in possession of the present disclosure. While a tracking device 200 has been illustrated and described, one of skill in the art in possession of the present disclosure will recognize that the teachings of the present disclosure will be beneficial for a variety of tracking devices and, as such, a wide variety of modifications to the number, types, and orientation of devices and components in the tracking device 200 will fall within the scope of the present disclosure as well.

Figure 3:
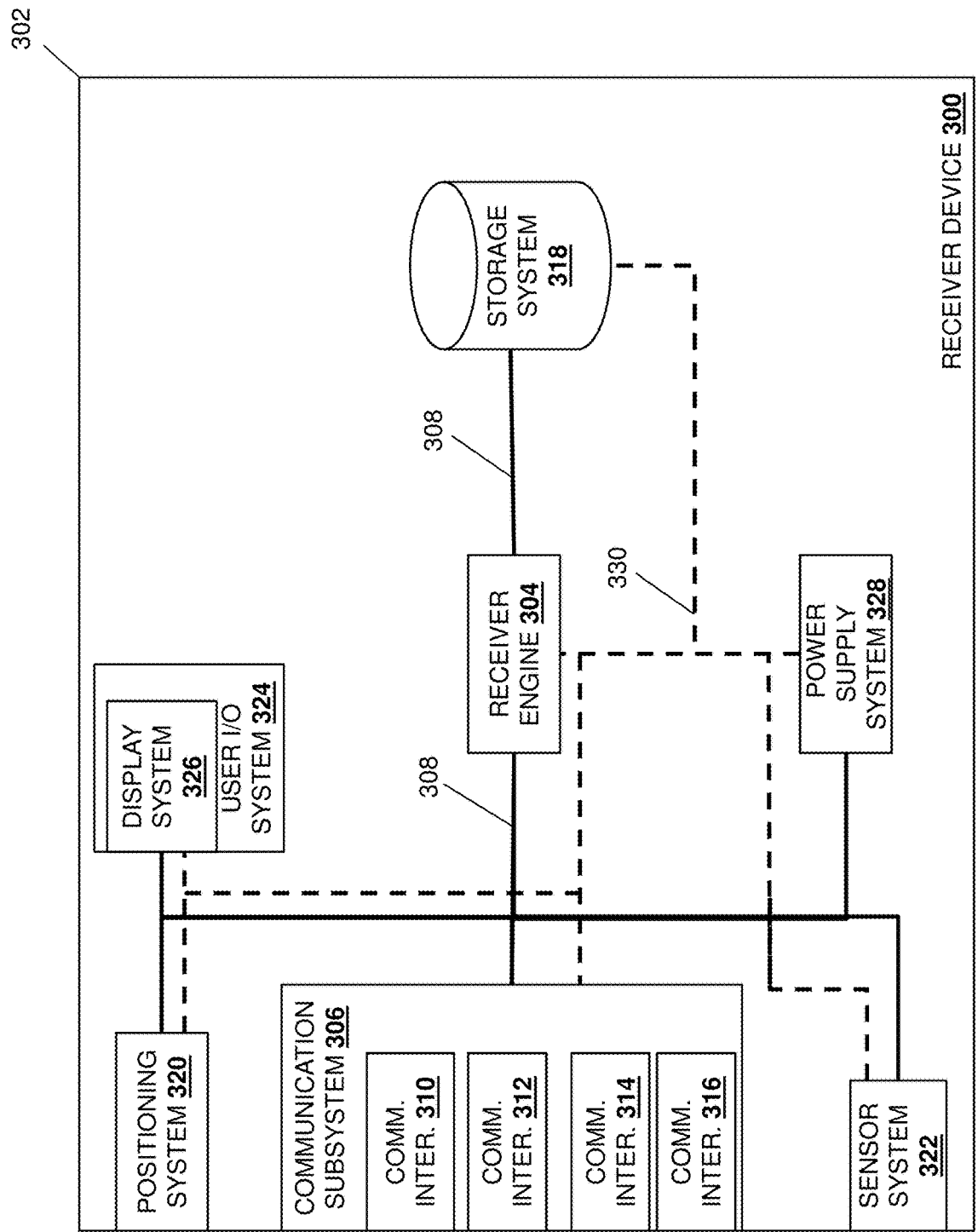
FIG. 3 is a schematic view illustrating an embodiment of a receiver device used in the track and locate system of FIG. 1.

Referring now to FIG. 3, an embodiment of a receiver device 300 is illustrated that may be the receiver device 126a and/or the receiver device 126b discussed above with reference to FIG. 1. In the illustrated embodiment, the receiver device 300 includes a chassis 302 that houses the components of the receiver device 300. Several of these components are illustrated in FIG. 3. For example, the chassis 302 may house a processing system (not illustrated) and a non-transitory memory system (not illustrated) that includes instructions that, when executed by the processing system, cause the processing system to provide a receiver engine 304 that is configured to perform the functions of the receiver engines and/or the receiver devices discussed below.

The chassis 302 may further house a communication subsystem 306 that is coupled to the receiver engine 304 (e.g., via a communication coupling 308 (e.g., a communication bus, trace, etc.) between the communication subsystem 306 and the processing system). The communication subsystem 306 may include software or instructions that are stored on a computer-readable medium and that allow the receiver device 300 to send and receive information through the communication networks described herein. For example, the communication subsystem 306 may include a communication interface 310 that corresponds with the communication interface 214 of the tracking device 102 to provide the functionality of the antenna 108 remotely (e.g., the LoRa network), as detailed above. In an embodiment, the communication interface 310 may include a wireless antenna that is configured to provide LoRa modulations or other wireless communications described above. The communication subsystem 306 may also include a communication interface 312 that corresponds with the communication interface 216 of the tracking device 102 to receive signals generated by the communication interface 216 (e.g., a beacon signal). The communication interface 312 may include a directional antenna (e.g., Yagi antenna) that is configured to indicate direction of received signals at the communication interface 312.

The communication subsystem 306 may also include a communication interface 314. In an embodiment, the communication interface 314 may be configured to operate to communicate with the network 122. In an embodiment, the communication interface 314 may be a wireless antenna that is configured to provide communications with IEEE 802.11 protocols (Wi-Fi), cellular communications (e.g., 3G, 4G, 4G LTE, 5G), satellite communications, and/or other microwave radio communications. The communication subsystem 306 may also include a communication interface 316 that is configured to provide direct communication with user devices, receiver devices, sensors, storage devices, and other devices within the physical environment 104 discussed above with respect to FIG. 1. For example, the communication interface 316 may include a relatively short-range transceiver when compared to the transceiver included in the communication interface 314. As such, the communication interface 316 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices other than the communication protocols used for the communication interfaces 310 and 312.

The chassis 302 may also house a storage system 318 that is coupled to the receiver engine 304 (e.g., via the coupling 308 between the processing system and the storage system 318). The storage system 318 may store geographic coordinates of the last known location of the tracking device 102, tracking device information (e.g., a tracking device identifier, tracking device capabilities, etc.), subject information about the subject 112 that is associated with the tracking device 102, receiver instructions, and/or other instructions and information that would be apparent to one of skill in the art in possession of the present disclosure.

In various embodiments, the chassis 302 may also include a positioning system 320 that is coupled to the receiver engine 304 (e.g., via the coupling 308 between the processing system and the positioning system 320). The positioning system 320 may include sensors that are configured to determine their current location and position. For example, the positioning system 320 may include a global positioning system (GPS) receiver, a real-time kinematic (RTK) GPS receiver, a differential GPS receiver, a Wi-Fi based positioning system (WPS) receiver, and/or a variety of other positioning systems and components that would be apparent to one of skill in the art in possession of the present disclosure.

In various embodiments, the chassis 302 may include a sensor system 322 that is coupled to the receiver engine 304 (e.g., via the coupling 308 between the processing system and the sensor system 322), and configured to provide for the monitoring of conditions of the receiver device 300 and/or conditions of the physical environment 104 around the receiver device 300 such as, for example, a motion sensor such as, for example, an orientation sensor (e.g., a gyroscope), an accelerometer, a magnetometer, and other motion sensors that would be apparent to one of skill in the art in possession of the present disclosure, environmental sensors such as, for example, temperature sensors, humidity sensors, pressure sensors, receiver device sensors such as, for example, component temperature sensors, power sensors, and/or any other receiver device sensor for monitoring the receiver device 300 that would be apparent to one of skill in the art, and/or any other sensor that would be apparent to one of skill in the art in possession of the present disclosure. In an embodiment, while described as the communication interface 312, a directional radio receiver for detecting radio waves may be provided in the sensor system 322.

In various embodiments, the sensor system may include an image capturing system (not illustrated) (e.g., via the coupling 308 between the processing system and the image capturing system). The image capturing system may include a two-dimensional image capturing camera, a three-dimensional image capturing camera, an infrared image capturing camera, a depth capturing camera, similar video recorders, and/or a variety of other image or data capturing devices that would be apparent to one of skill in the art in possession of the present disclosure. The image capturing system may be a camera and/or any other sensor device that may be used to gather visual information from the physical environment 104 surrounding the receiver device 300. For example, the image capturing system may provide a video feed from the vehicular device 136 to a remote monitor (e.g., a user device 124) when the receiver device 126a is coupled to the vehicular device 136 such that a remote operator can view the physical environment 104 via the receiver device 300.

In various embodiments, the chassis 302 also houses a user I/O system 324 that is coupled to the receiver engine 304 (e.g., via the coupling 308 between the processing system and the user I/O system 324). In an embodiment, the user I/O system 324 may include a user input subsystem be provided by a keyboard input system, a mouse input system, a track pad input system, a touch input display system, and/or any other input system. In an embodiment, the user I/O system 324 may include a user output subsystem such as, for example, a haptic feedback device, a speaker, a light (e.g., an LED) and/or any other user output subsystem that would be apparent to one of skill in the art in possession of the present disclosure. In various embodiments, the user output subsystem may also include a display system 326 that is coupled to the receiver engine 304 (e.g., via the coupling 308 between the processing system and the display system 326). In an embodiment, the display system 326 may be provided by a display device that is integrated into the receiver device 300 and that includes a display screen (e.g., a display screen on a laptop/notebook computing device, a tablet computing device, a mobile phone, or wearable device), or by a display device that is coupled directly to the receiver device 300 (e.g., a display device coupled to the receiver device 300 by a cabled or wireless connection).

The chassis 302 also houses a power supply system 328 that may include and/or be configured to couple to a battery. For example, the battery may include an integrated rechargeable battery that may be recharged in the chassis 302 using methods known in the art, and/or may include other power sources that would be apparent to one of skill in the art in possession of the present disclosure. In some embodiments, the user device 124 discussed above with reference to FIG. 1 may be configured to couple to the chassis 302 (e.g., via a port system that includes a power port) that may provide for the recharging of a rechargeable battery included in the power supply system 328. In other examples, the power port may be coupled to any other external power supply such as a wall outlet, a charging device that is coupled to a wall outlet, a docking station coupled to a solar panel, provide an induction device that wirelessly receives power from another induction device, or any other power supply that would be apparent to one of skill in the art in possession of the present disclosure In various embodiments, port systems may include a data port configured to communicate data between the receiver device 300 and the user device 124 (e.g., via a cable or other connector). In other embodiments, the power supply system 328 may be configured to accept a replaceable, non-rechargeable battery while remaining within the scope of the present disclosure as well. The power supply system 328 may be coupled to a power bus 330 that is coupled to the processing system, the memory system, the communication subsystem 306, the storage system 318, the sensor system 322, the positioning system 320, the user I/O system 324, and/or other components included in the chassis 302.

While a receiver device 300 has been illustrated and described, one of skill in the art in possession of the present disclosure will recognize that the teachings of the present disclosure will be beneficial for a variety of receiver devices that would be apparent to one of skill in the art in possession of the present disclosure and, as such, a wide variety of modifications to the number, types, and orientation of devices and modules in the receiver device 300 will fall within the scope of the present disclosure as well. For example, while the receiver device 300 is described as being the receiver devices 126a and 126b, the receiver device 300 may include may include a combination of the user device 124 and the receiver device 126b or a combination of the vehicular device 136, the receiver device 126a and optionally the user device 124 such that various components of the receiver device 300 are provided in a separate chassis. For example, the receiver device 126b may be a handheld directional radio antenna coupled wirelessly or via a wire to the user device 124 that provides the receiver engine 304, a display system 326, a portion of the receiver engine 304, and/or a portion of the communication interfaces 310-316.

Figure 4:
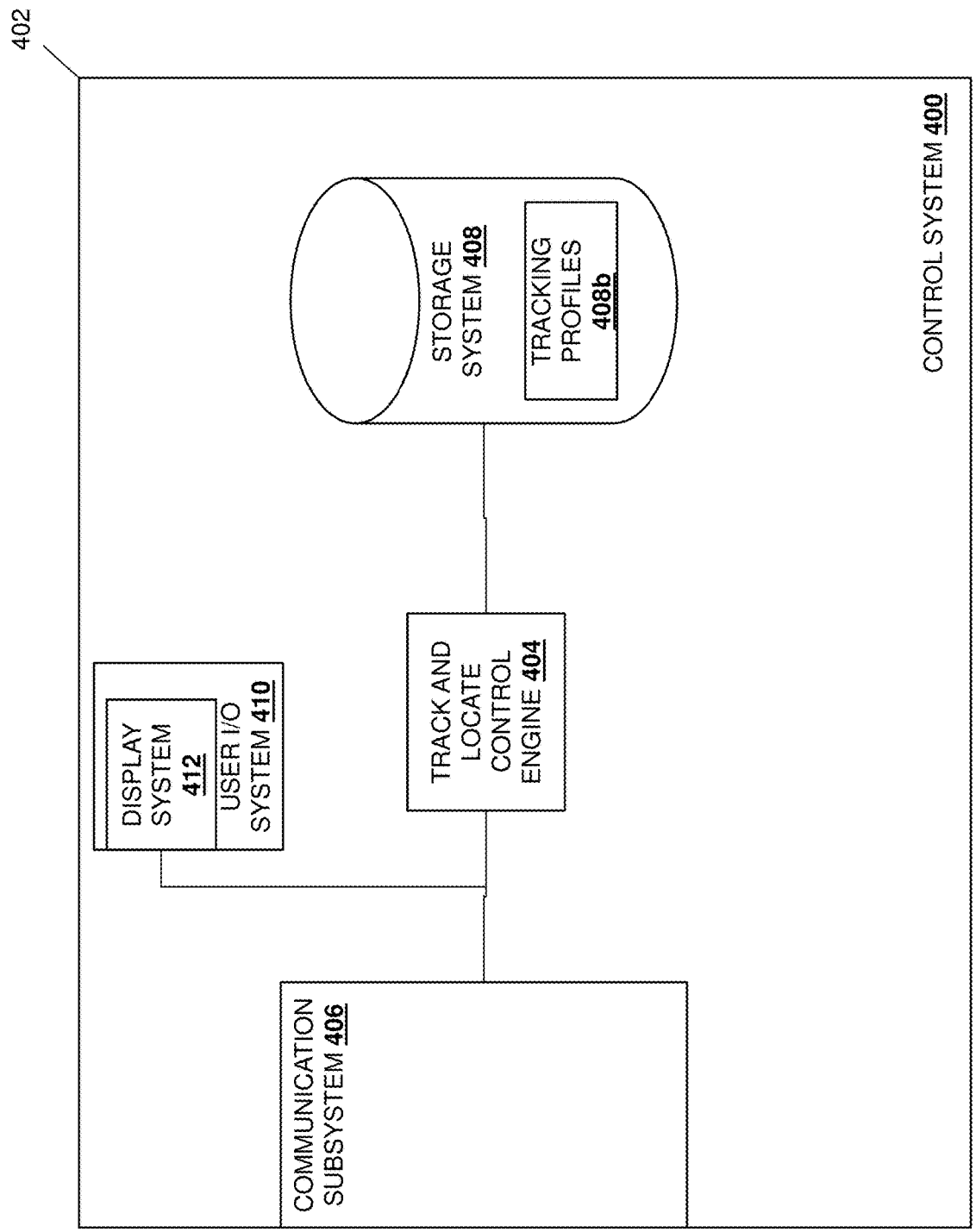
FIG. 4 is a schematic view illustrating an embodiment of a control system used in the track and locate system of FIG. 1.

Referring now to FIG. 4, an embodiment of a control system 400 is illustrated that may be the control system 116 discussed above with reference to FIG. 1. In the illustrated embodiment, the control system 400 includes a chassis 402 that houses the components of the control system 400, only some of which are illustrated in FIG. 4. For example, the chassis 402 may house a processing system (not illustrated) and a non-transitory memory system (not illustrated) that includes instructions that, when executed by the processing system, cause the processing system to provide a track and locate control engine 404 that is configured to perform the functions of the track and locate control engines and/or control systems discussed below.

The chassis 402 may further house a communication system 406 that is coupled to the track and locate control engine 404 (e.g., via a coupling between the communication system 406 and the processing system) and that is configured to provide for communication through one or more networks as detailed below. The communication system 406 may allow the control system 400 to send and receive information over the communication network 122 of FIG. 1. As discussed above, the communication system 406 may allow the control system 400 to send and receive information via the gateway 114 and the antenna 108. The chassis 402 may also house a storage system 408 that is coupled to the track and locate control engine 404 through the processing system and that is configured to store the rules and/or other data utilized by the track and locate control engine 404 to provide the functionality discussed below. For example, the storage system 408 may store tracking device tables 408a in one or more repositories that include associations of subjects, tracking devices 102, tracking device status, location information of the tracking devices, tracking device sequence numbers, and/or the like. In addition, the storage system 408 may store track and locate conditions and track and locate instructions that the track and locate control engine 404 may use to monitor the tracking device tables 408a, determine when track and locate conditions are satisfied based on the tracking device tables 408a, and provide instructions associated with those satisfied conditions. While the storage system 408 has been illustrated as housed in the chassis 402 of the control system 400, one of skill in the art will recognize that the storage system 408 may be connected to the track and locate control engine 404 through the communication network 122 via the communication system 406 without departing from the scope of the present disclosure.

In various embodiments, the chassis 402 also houses a user I/O system 410 that is coupled to the track and locate control engine 404 (e.g., via a coupling between the processing system and the user I/O subsystem 410). In an embodiment, the user I/O system 410 may include a user input subsystem such as, for example, a keyboard input system, a mouse input system, a track pad input system, a touch input display system, and/or any other input system. In an embodiment, the user I/O system 410 may include a user output subsystem such as, for example, a haptic feedback device, a speaker, a light (e.g., an LED) and/or any other user output subsystem that would be apparent to one of skill in the art in possession of the present disclosure. In various embodiments, the user output subsystem may also include a display system 412 that is coupled to the track and locate control engine 404 (e.g., via the coupling between the processing system and the display system 412). In an embodiment, the display system 412 may be provided by a display device that is integrated into the control system 400 and that includes a display screen (e.g., a display screen on a laptop/notebook computing device, a tablet computing device, a mobile phone, or wearable device), or by a display device that is coupled directly to the control system 400 (e.g., a display device coupled to the control system 400 by a cabled or wireless connection). However, in other embodiments the user I/O system 410 and the display system 412 may be included in a client device that is coupled to the control system 400 via the communication system 406. While a control system 400 has been illustrated and described, one of skill in the art in possession of the present disclosure will recognize that the teachings of the present disclosure will be beneficial for a variety of control systems and, as such, a wide variety of modifications to the number, types, and orientation of devices and components in the control system 400 will fall within the scope of the present disclosure as well.

Figure 5:
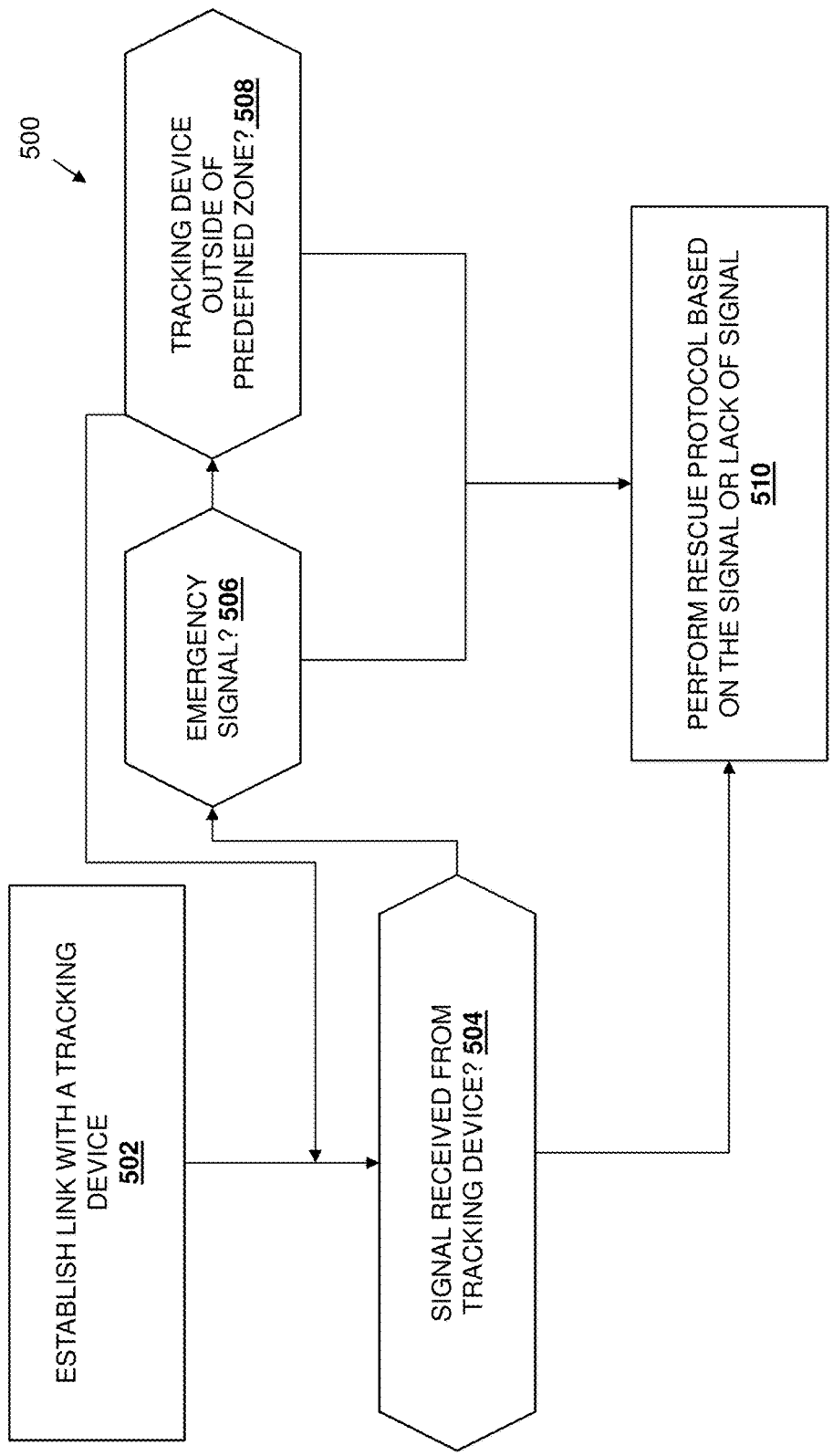
FIG. 5 is a flow chart illustrating an embodiment of a method of track and locate performed by the control system of FIG. 4.

Referring now to FIG. 5, an embodiment of a method 500 of track and locate by a control system is illustrated. The method 500 will be discussed in reference to the FIGS. 1-4 above. The method 500 begins at block 502 where a link is established between a control system and a tracking device. In an embodiment, at block 502, the control system 116 may establish a link with one or more tracking devices 102. The track and locate control engine 404 of the control system 400 may establish, via the communication system 406, the gateway 114, and the antenna 108, a wireless link with the communication interface 214 of the communication subsystem 210 included on the tracking device 102. For example, when the tracking device 102 comes in communication range of the antenna 108, the tracking device 102 and the antenna 108 may perform a discovery process according to the communication protocol being used to establish the wireless link. For example, the tracking device 102 may be configured to broadcast a discovery signal, which establishes the wireless link. The discovery signal may be a LoRa signal that establishes the wireless link with the control system 116 and may include a tracking device identifier (e.g., a serial number, and/or other tracking device identifier that would be apparent to one of skill in the art).

In other embodiments, the tracking device 102 may awake from a sleep mode and perform the discovery process with the control system 116 to the wireless link. The control system 116 may have previously provided instructions to the tracking device 102 to enter and exit a sleep mode when a predetermined condition(s) exists such as, for example, predetermined time(s) of day. In a specific example, the control system 116 may have provided, during a previous communication session with the tracking device, instructions to the tracking device 102 to enter a sleep mode during a time when the tracking devices is typically not in use (e.g., when the subject 112 is asleep, when a business is closed, etc.) and instructions to enter an awake mode when the tracking device 102 is in use (e.g., when the subject 112 is awake or allowed to roam freely, when the business is open, etc.).

Figure 8A:
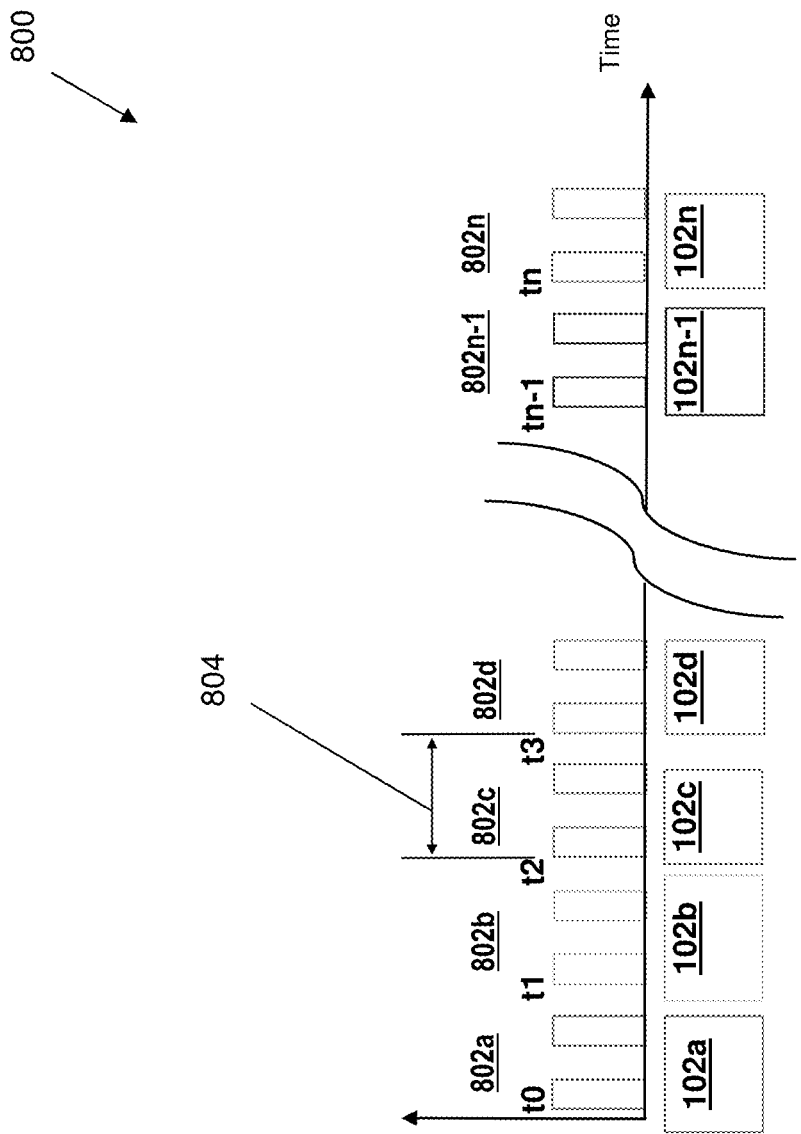
FIG. 8A is a tracking device optimization graph illustrating a timing of initial alive signals of each tracking device establishing a link with the control system used in the track and locate system of FIG. 1.

In various embodiments, the establishment of the link between the control system 116 and the tracking device 102 may be offset in relation to the establishment of a link between the control system 116 and other tracking devices that are included in the track and locate system 100. For example and referring to FIGS. 8A and 8B that illustrates a tracking device optimization graph 800, a first tracking device 102a may send its discovery signal 802a at t0, while a second tracking device 102b may send a discovery signal 802b subsequent to t0 at t1. Subsequently, a third tracking device 102c may send its discover signal 802c at t2, a fourth tracking device 102d may send its discovery signal 802d at t3, a fifth tracking device 102n-1 may send its discovery signal 802n-1 at tn−1, and up to an nth tracking device 102n may send its discovery signal 802n at tn. The tracking devices 102a-102n may send the discovery signals 802a-802n at a predetermined time interval 804. The tracking devices 102a-102n may send the discovery signals 802a-802n at predetermined time interval to avoid data collision. In the illustrated example in FIG. 8A, the predetermined time period may be 2 seconds. However, other predetermined time intervals may be contemplated by one skill in the art in possession of the present disclosure (e.g., 3 seconds, 4 seconds, 10 seconds, etc.). The order of the discovery signals 802a-802n may be determined based on the tracking device identifiers for each of the tracking device 102a-102n. For example, the lowest valued tracking device identifier may perform discovery with the control system 116 first while the highest tracking device identifier may perform the discovery with the control system 116 last. However, one of skill in the art will recognize that other characteristics of the tracking devices 102a-102n may be used to determine the order of discovery with the control system 116.

Figure 8B:
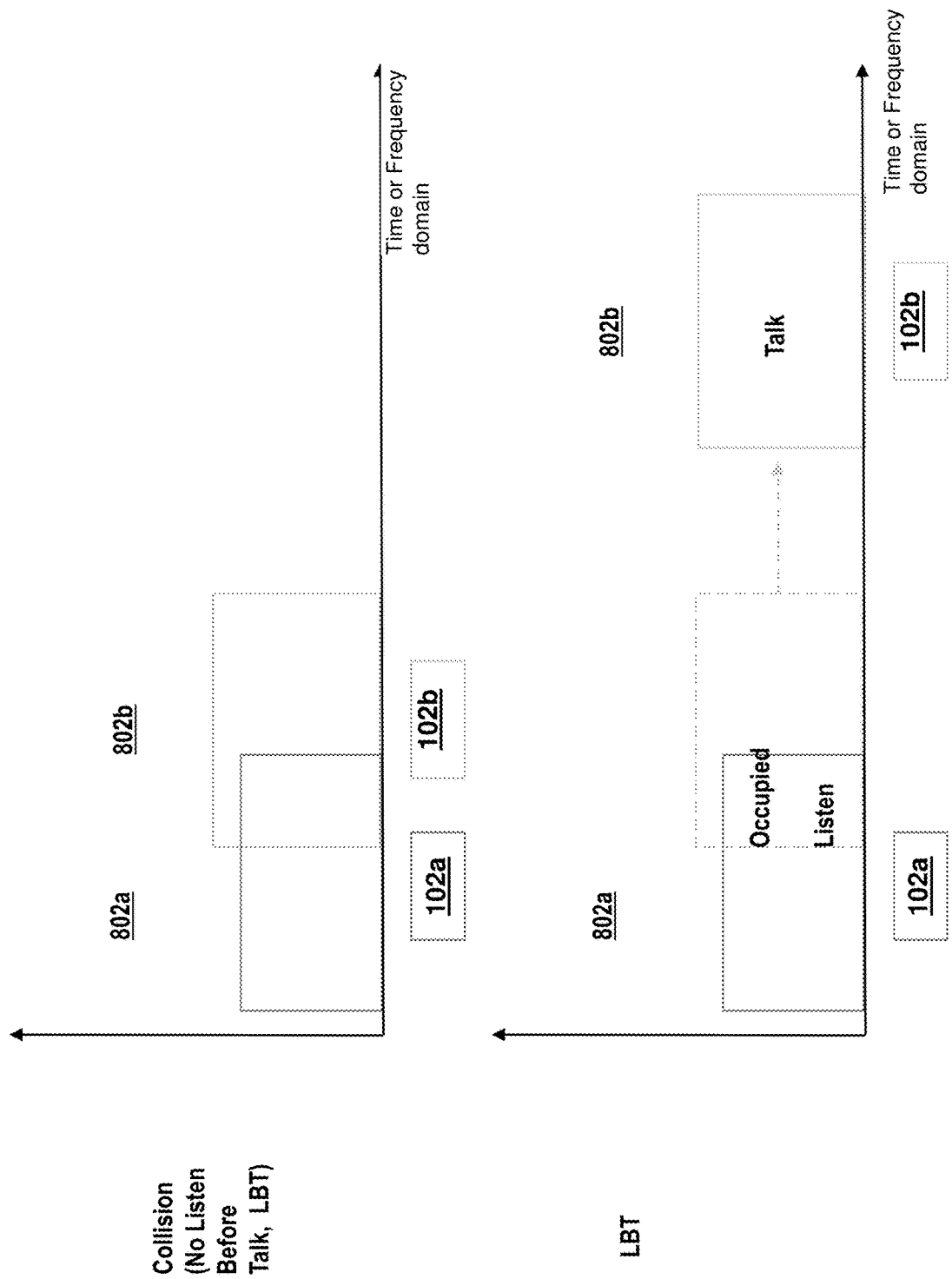
FIG. 8B is a tracking device optimization graph illustrating collision avoidance of initial alive signals of each tracking device establishing a link with the control system used in the track and locate system of FIG. 1.

FIG. 8B illustrates a concept of Listen Before Talk (LBT) to govern the transmission. Each tracking device 102a-102n will detect if the frequency channel is occupied by other devices before transmission. If occupancy is detected due to, for example, the signal 802a from the tracking device 102a, the tracking device 102b will attempt transmission of signal 802b again at another time slot or different frequency channel.

The control system 116, as illustrated in FIG. 9, may maintain a tracking device table 900 that may include the tracking device table 408a of FIG. 4 that includes tracking device profiles for the various tracking devices 102a-102n. The tracking device table 900 may include tracking device table entries 910a, 910b, and up to 910n. Tracking device table 408a may also include tracking device table columns 912a, 912b, 912c, 912d, 912e, 912f and up to 912n. The tracking device table column 912a may include a sequence number that defines the order at which the tracking devices provide signals to the control system 116. The tracking device table column 912b and other sub-columns may include information about the subject associated with a tracking device (e g, name, family contact information, an identifier of the subject 112, description of the subject 112, a room number to which the subject 112 is assigned, and/or other subject information that would be apparent to one of skill in the art in possession of the present disclosure. The tracking device table column 912c may include tracking device information such as a tracking device identifier (e.g., a serial number). The tracking device table column 912d may include a record of when the signals are received from the tracking device that is associated with the tracking device table entry. The tracking device table column 912e may include a log of when a signal of the tracking device for that tracking device table entry was missed. The tracking device table column 912f may include a current status of the tracking device for the tracking device table entry (e.g., a sleep mode, an awake mode, a warning mode, a critical mode, a lost mode, an event mode, an emergency mode, a receiver mode, and/or any other mode that would be apparent to one of skill in the art in possession of the present disclosure). The tracking device table column 912*n* may include a log of location information for the tracking device associated with the tracking device table entry. The location information in the tracking device table column 912*n* may be associated with each signal received record in the tracking device table column 912*d*. While a specific tracking device table 900 is illustrated in FIG. 9, one of skill in the art in possession of the present disclosure will recognize that other tracking profiles, profile information and format are contemplated.

The method 500 then proceeds to decision block 504 where it is determined whether a signal is received from the tracking device within a predetermined time period. In an embodiment, at decision block 504, the control system 116 may monitor the physical environment 104 for alive signals from the tracking device 102. The control system 116 may be configured to determine whether the alive signal from the tracking device 102 is received in the predetermined time period. The predetermined time period may be determined based on the location of the tracking device 102. For example, the predetermined time period for detecting whether an alive signal for detecting whether a tracking device 102 is received that is within the zone 104*a* may be every 15 minutes or other time period that would be apparent to one of skill in the art in possession of the present disclosure. If the tracking device 102 is within the zone 104*b*, the predetermined time period may be 10 minutes or other predetermined time period that would be apparent to one of skill in the art in possession of the present disclosure. However, in other embodiments, the predetermined time interval may be based on a time of day, a day of the week, a particular subject and/or any other predetermined time period condition that would be apparent to one of skill in the art in possession of the present disclosure.

If, at decision block 504, the signal is received from the tracking device within the predetermined time period, the method 500 proceeds to decision block 506, where it is determined whether the signal received is an emergency signal. In an embodiment, at decision block 506, the tracking device 102 may emit an emergency signal when the tracking device 102 is within the range of antenna 108. For example, a subject 112 may press the emergency button 228*a* on the tracking device 102 to indicate that the subject 112 is in need of assistance. In other examples, the sensor system 224 may provide sensor signals to the tracking engine 208 that satisfies an emergency condition and that may result in the tracking device 102 providing an emergency signal via the communication interface 214. For example, a motion sensor included in the sensor system 224 may detect a motion and generate a motion signal that is processed by the tracking engine 208. The tracking engine 208 may determine that an emergency condition has been satisfied from the motion signal such as an indication that the subject 112 has fallen. The tracking engine 208 causes the tracking device 102 to provide an emergency signal via the communication interface 214 that may be received by the control system 116. In other examples, the sensor system 224 may detect biometric characteristics (e.g., a heart rate, a blood pressure, and/or other biometric characteristics) and generate biometric signals that are processed by the tracking engine 208. The tracking engine 208 may determine that an emergency condition has been satisfied based on the biometric signals and may provide an emergency signal via the communication interface 214 that may be received by the control system 116. One of skill in the art will recognize that other sensor data/signals that satisfies an emergency condition may be contemplated by one of skill in the art in possession of the present disclosure. For example, an emergency signal may be provided if the tracking engine 208 detects that the battery power has reached power has reached a predetermined threshold (e.g., low battery power) or other components within the tracking device 102 have malfunctioned or satisfied some condition.

If, at decision block 506, there is no emergency signal included in the signal received within the predetermined time period, then the method 500 may proceed to decision block 508 where it is determined whether the signal indicates that the location of the tracking device is outside of a predefined zone. In an embodiment, at decision block 508, the control system 116 may determine whether location information included in the alive signal received from the tracking device 102 within the predetermined time period indicates that the tracking device 102 is outside of the predefined zone that is a safety zone. In various embodiments, the alive signal from the tracking device 102 may include location information such as, for example, geographical coordinates within the physical environment 104. The tracking device 102 may, at a predefined time period, use the positioning system 222 to determine a location of the tracking device 102 and provide that location information to the control system 116 in each alive signal transmitted from the tracking device 102. For example, the positioning system 222 may include a GPS device that determines geographical coordinates of the tracking device 102 and the tracking device 102 provides those geographical coordinates to the control system 116 in the next alive signal. While specific examples of determining a location of a tracking device 102 in the physical environment 104 are described, one of skill in the art in possession of the present disclosure will recognize that other location determining methods may be used without departing from the scope of the present disclosure.

The control system 116 may compare the location information for the tracking device 102 received to the location information that defines the predefined zone. For example, zone 104*a* may be designated as the predefined zone that is a safety zone where no action is taken by the control system 116 when the tracking device 102 is located within the zone 104*a* and the tracking device 102 operates in a "normal" mode. The control system 116 may compare the geographical coordinates of the tracking device 102 to the geographical coordinates that define the zone 104*a* to determine whether the geographical coordinates of the tracking device 102 are within the area/volume of the zone 104*a*. If the tracking device 102 is within the predefined zone, the method 500 returns to decision block 504 where the control system 116 waits for the next signal from the tracking device 102.

However, if at decision block 508 the tracking device is outside of the predefined zone, then the method 500 may proceed to block 510 where a rescue protocol is performed based on the signal. Block 510 may also be performed if, at decision block 506, the signal received from the tracking device is an emergency signal. Furthermore, if at decision block 504 no signal is received from the tracking device, block 510 may be performed such that a rescue protocol is performed based on the lack of signal. In an embodiment, at block 510, the track and locate control engine 404 may perform a rescue protocol based on the signal received from the tracking device 102 or the lack of signal (e.g., when an expected signal from the tracking device 102 was supposed to be received but was not received).

For example, in response to the alive signal from tracking device 102 indicating that the tracking device 102 is outside of the predefined zone at decision block 508, the track and locate control engine 404 of the control system 116 may determine which zone the tracking device 102 is within and the corresponding rescue protocol for that zone. If the track and locate control engine 404 determines that the tracking device 102 is within the zone 104b, the track and locate control engine 404 may refer to a rescue protocol associated with the zone 104b that is stored in the storage system 414. The rescue protocol for the zone 104b may include providing tracking device instructions to the tracking device 102 to cause the tracking device 200 to perform one or more actions. For example, the tracking device instructions may cause the tracking engine 208 to capture and provide positioning information to the control system 116 via the antenna 108 more frequently than the rate at which positioning information and/or alive signals are provided when the tracking device 102 is within the predefined zone (e.g., the zone 104a). In an embodiment, the tracking device instructions may include instructions to provide an output on the user I/O system 228 to alert the subject 112 that the tracking device 102 has left the predefined zone (e.g., the zone 104a). Specifically, the tracking engine 208 may process the tracking device instructions and cause a haptic feedback device included on the user input/output system 228 to vibrate, cause a speaker system included on the user I/O system 228 to provide a warning sound, cause a display system and/or an LED included on the user I/O system 228 to provide a warning display, and/or cause other outputs on the user I/O system 228 that would be apparent to one of skill in the art in possession of the present disclosure.

In various embodiments, the rescue protocol for the zone 104b may include providing control system instructions to components of the control system 116. For example, the control system instructions, when processed by the track and locate control engine 404 of the control system 116, may change characteristics of the wireless communication signal 108a (e.g. cause the gateway 114 to provide a modulation signal with increased spreading factor to increase a range of the wireless communication signal (108a), cause the user I/O system 410 coupled to the control system 116 to provide an output (e.g., a loudspeaker coupled to the control system 116 that provides an alert to the subject 112 to return to the predefined zone (e.g., the zone 104a), cause the display system 412 to provide a warning display to the operator 140, cause a speaker system that provides an alarm to the operator 140, and/or other outputs via other user output devices included in the user I/O system 410 coupled to the control system 116 that would be apparent to one of skill in the art in possession of the present disclosure. While specific control system instructions are discussed, one of skill in the art in possession of the present disclosure will recognize that other control system instructions may be contemplated without departing from the scope of the present disclosure.

In various embodiments, the rescue protocol for the zone 104b may include providing user device instructions to devices that are coupled to the control system 116 via the network 122. For example, the control system 116 may provide user device instructions to the user device 124 to alert a user (e.g., the rescuer 138, the operator 140) that the tracking device 102 is located in the zone 104b. Similarly, the control system 116 may provide vehicular device instructions to the vehicular device 136 to dispatch to the vehicular device 136 to monitor the tracking device 102.

While specific user device instructions are discussed, one of skill in the art in possession of the present disclosure will recognize that other user device instructions may be contemplated without departing from the scope of the present disclosure.

If the track and locate control engine 404 determines that the tracking device 102 is within the zone 104c, the track and locate control engine 404 may refer to a rescue protocol associated with the zone 104c that is stored in the storage system 408. The rescue protocol for zone 104c may include providing tracking device instructions, control system instructions, and/or user device instructions as discussed above. Because the zone 104c is further out from the central point of the nursing home facility 106, the rescue protocol may include more of the tracking device instructions, the control device instructions, and/or the user device instructions than discussed above for the zone 104b. For example, the user device 124 may not be alerted when the tracking device 102 is in the zone 104b but will be alerted if the tracking device 102 is in the zone 104c. In other examples, the characteristics defined by the instructions for scenarios when the tracking device 102 is located in the zone 104c may be of a higher degree than characteristics defined by the by the instructions provided when the tracking device 102 is located in the zone 104b. For example, when the tracking device 102 is located in the zone 104c, the control instructions may cause the gateway 114 to increase the SF of the wireless communication signal 108a provided by the antenna 108 from the SF of the wireless communication signal 108a provided by the antenna 108 when the tracking device 102 is in the zone 104b. However, in other embodiments, the LoRa operation may be managed by tracking device 102 and gateway 114 independently. In other examples, the tracking device instructions may cause the speaker output on the tracking device 102 to be louder when the tracking device 102 is in the zone 104c than when the tracking device 102 is in the zone 104b. Thus, one of skill in the art will recognize that the rescue protocol for a given zone may be associated with one or more tracking device instructions, one or more control device instructions, one or more user device instructions, and/or other instructions that would be apparent to one of skill in the art in possession of the present disclosure and each zone may be associated with its own unique set of instructions that may be predefined by the administrator of the track and locate system 100.

If at decision block 506 the signal received from the tracking device is an emergency signal, then, at block 510, a rescue protocol may be performed based on the emergency signal. In an embodiment, at block 510, the control system 116 may use the emergency signal to look up a rescue protocol in the storage system 414 that is generally related to emergency signals or related to a specific emergency signal received. For example, if the emergency signal is a result of the sensor system 224 in the tracking device 102 indicating a fall or motion event of the subject 112, then an emergency rescue protocol that includes a first set of emergency instructions may be performed by the control system 116. The first set of emergency instructions may include any of the tracking device instructions, control system instructions, and/or user device instructions discussed above. However, other emergency instruction may be contemplated such as, for example, control system instructions to provide notifications to user devices of rescuers indicating that the subject 112 associated with the tracking device 102 has possibly fallen, control system instructions to automatically send a notification to an emergency dispatch service via the network 122, which can send emergency responders (e.g., police, ambulance, etc.) to the location of the emergency signal. In another example, if the emergency signal is a result of the subject 112 providing an emergency input to the user I/O system 228 (e.g., via an emergency button), then an emergency rescue protocol that includes a second set of emergency instructions may be performed by the control system 116. The second set of emergency instructions may include different tracking device instructions, control system instructions, and/or user device instructions than the first set of emergency instructions. However, in other embodiments, the emergency rescue protocol may be the same for any emergency event such that the first set of emergency instructions are the same as the second set of emergency instructions. Thus, one of skill in the art will recognize that the emergency rescue protocol associated with an emergency signal may be associated with one or more tracking device instructions, one or more control system instructions, one or more user device instructions, and/or other instructions that would be apparent to one of skill in the art in possession of the present disclosure and each emergency may be associated with its own unique set of instructions that may be predefined by the administrator of the track and locate system 100.

If at decision block 504 no signal is received from the tracking device, then, at block 510, a rescue protocol may be performed based on lack of signal from the tracking device. In an embodiment, at block 510, the control system 116 may use the lack of signal to look up a rescue protocol in the storage system 414 that is associated with the lack of an alive signal transmitted from the tracking device 102. In various embodiments, the rescue protocol for the lack of an alive signal from the tracking device 102 may be based on the number of periods that the control system 116 has not detected the alive signal from tracking device 102. For example, if the control system 116 cannot detect the tracking device 102 within one period, then the control system 116 may alert the operator 140 of the control system 116 with a notification that the tracking device 102 is not detected via the user I/O system 410 of the control system 116. If the control system 116 cannot detect the alive signal from the tracking device 102 within two periods, then the control system 116 will trigger a notification to the receiver device 126a included on the vehicular device 136 and/or the receiver device 126b associated with the rescuer 138 to locate the tracking device 102 as the tracking device 102 is out of range of the wireless communication signal 108a.

The rescue protocol may include sending receiver device instructions to the receiver device 126a and/or 126b. The receiver device instructions may include instructions that cause the receiver device 126a and/or 126b to activate at least the communication interface 310 and the communication interface 312 such that the receiver device 126a and/or 126b can receive communications from communication interfaces 214 and 216, respectively, on the tracking device 102 that should be providing signals. For example, the communication interface 214 may be providing the alive signals that the communication interface 214 provides to the antenna 108. The communication interface 216 may be providing beacon signals that the tracking device 102 provides when the communication interface 214 is no longer in range of the wireless communication signal 108a that is provided by the antenna 108. The receiver instructions may include activating the communication interface 314 and/or the communication interface 316 such that the receiver device 126a and/or 126b can communicate with another receiver device, the user device 124, and/or the network 122. The receiver device instruction may include a last known location of the tracking device 102 such that the receiver device 126a and/or 126b may move to that location to determine whether the receiver device 126a and/or 126b can detect the tracking device 102 from that location. In other examples, the receiver device instructions may include the last two known locations of the tracking device 102 such that the receiver device 126a and/or 126b can estimate a direction in which the tracking device 102 may have been moving prior to becoming undetectable by the control system 116. The receiver device instructions may include tracking device information, subject information, and/or any other information that is associated with the tracking device 102 that may help the rescuer 138 and/or the vehicular device 136 locate the tracking device 102. In addition, the rescue protocol for lack of signal from the tracking device 102 may include control system instruction and/or user device instructions that are performed by the control system 116 and the user device 124. For example, the control system 116 may push notifications and tracking device information (e.g., the tracking device identifier, last GPS location, etc), subject information, and/or any other information to the user device 124 via the internet.

Figure 6:
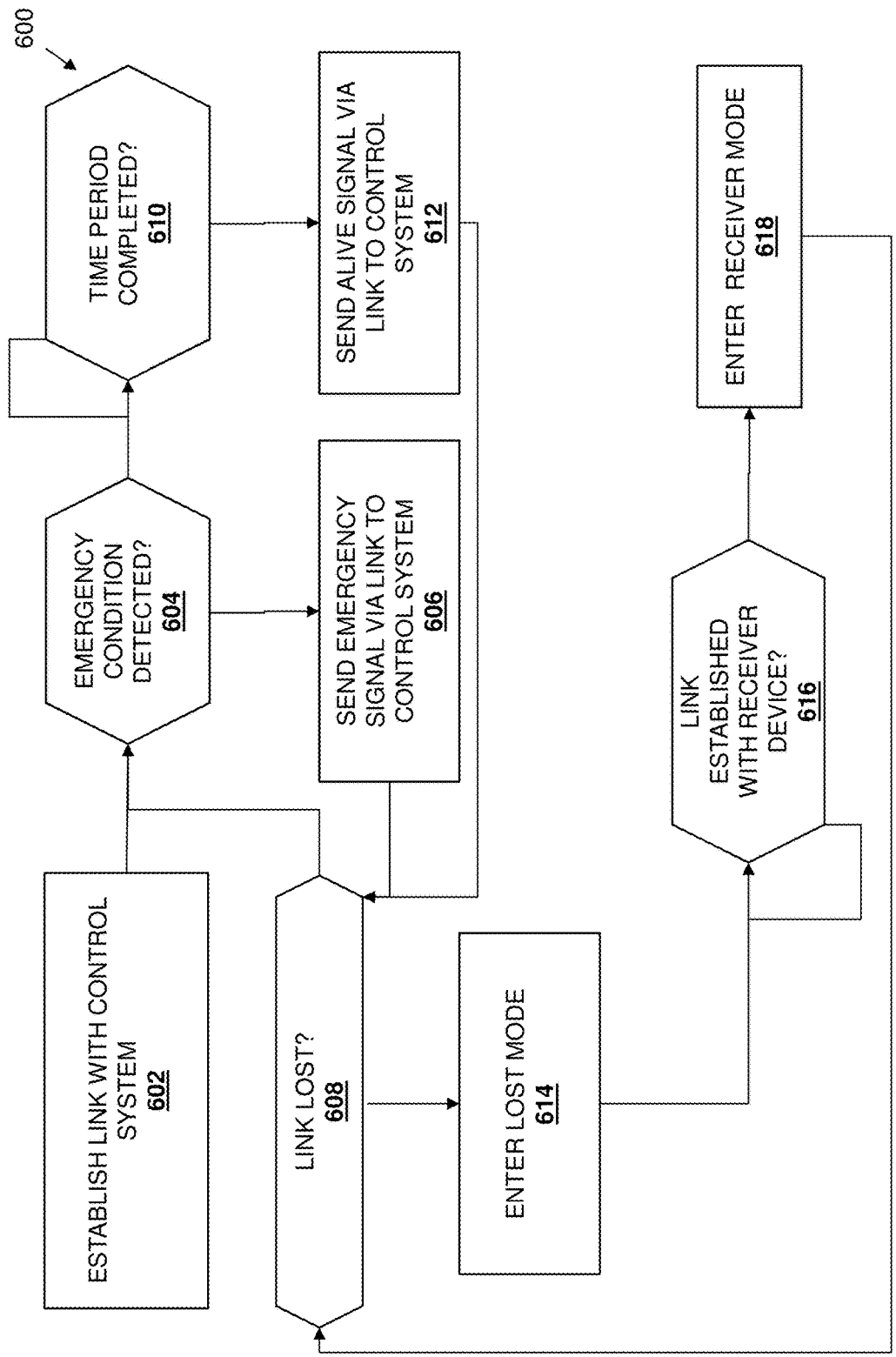
FIG. 6 is a flow chart illustrating an embodiment of a method of track and locate performed by the tracking device of FIGS. 2A and 2B.

Referring now to FIG. 6, an embodiment of a method 600 of track and locate by a tracking device is illustrated. The method 600 will be discussed in reference to the FIGS. 1-4 above. The method 600 begins at block 602 where a link is established between a control system and a tracking device. In an embodiment, at block 602, the tracking device 102 may establish a link with the control system 116. The tracking engine 208 of the tracking device 102 may establish, via the communication interface 214 of communication subsystem 210, the antenna 108, and the gateway 114, a wireless link with the communication system 406 included on the control system 116. For example, when the tracking device 102 is within communication range of the antenna 108, the tracking device 102 and antenna 108 may perform a discovery process according to the communication protocol being used to establish the wireless link. For example, the tracking device 102 may be configured to broadcast a discovery signal (e.g., one of the discovery signals 802a-802n, illustrate if FIG. 8), which establishes the wireless link with the control system 116. The discovery signal may be a LoRa signal that establishes the wireless link with the control system 116 and may include a tracking device identifier (e.g., a serial number, and/or other tracking device identifier that would be apparent to one of skill in the art) and/or any other tracking device information and/or subject information that would be apparent to one of skill in the art in possession of the present disclosure. The tracking device 102 may receive an acknowledgement in response to sending the discovery signal to the control system 116, which may establish the wireless link.

In other embodiments, the tracking device 102 may awake from a sleep mode and perform the discovery process with the control system 116 to establish the wireless link. The control system 116 may have previously provided instructions to the tracking device 102 to enter and exit a sleep mode when a predetermined condition(s) exists such as, for example, a predetermined time of day. In a specific example, the control system 116 may have provided, during a previous communication session with the tracking device 102, instructions to the tracking device 102 to enter the sleep mode during a time when the tracking device 102 is typically not in use (e.g., when the subject 112 is asleep, when a business is closed, intervals between alive signals, etc.) and instructions to enter the awake mode when the tracking device 102 is in use (e.g., when the subject 112 is awake or allowed to roam freely, when the business is open, etc.). In other examples, the control system 116 may provide instructions for the tracking device 102 to "wake up" only when the tracking device 102 transmits an alive signal at predetermined intervals. Because a chance exists that the instructions from the control system 116 may be lost due to interference or missing the wake up period of the tracking device 102, the tracking device 102 may be configured to acquire its location to decide on the interval of the alive signal.

The method 600 may then proceed to decision block 604 where it is determined whether an emergency condition is detected. In an embodiment, at decision block 604, the tracking engine 208 may monitor the tracking device 102, the subject 112, and/or the physical environment 104 for emergency conditions. For example, the subject 112 may press the emergency button 228a on the tracking device 102 to indicate that the subject 112 is need of assistance. The tracking engine 208 may monitor the user I/O system 228 to determine whether the emergency button 228a has been activated by the subject 112. In other examples, the tracking engine 208 may monitor the sensor system 224 for sensor signals that satisfy an emergency condition for which the tracking engine 208 monitors. For example, a motion sensor included in the sensor system 224 may detect a motion and a generate motion signal that is processed by the tracking engine 208. The tracking engine 208 may determine that an emergency condition has been satisfied base on the motion signal such as an indication that the subject 112 has fallen. In other examples, the sensor system 224 may detect biometric characteristics (e.g., a heart rate, a blood pressure, and/or other biometric characteristics) and generate biometric signals that are processed by the tracking engine 208. The tracking engine 208 may determine that an emergency condition has been satisfied based on the biometric signals. One of skill in the art will recognize that other sensor data that satisfies an emergency condition would be contemplated by one of skill in the art in possession of the present disclosure.

If, at decision block 604, an emergency condition is detected by the tracking device, then the method 600 may proceed to block 606 where an emergency signal is sent via the link to the control system. In an embodiment, at block 606, the tracking engine 208 may provide an emergency signal to the control system 116. The tracking engine 208 may provide the emergency signal via the communication interface 214. The emergency signal may include emergency information (e.g., what caused the emergency signal to be generated) as well as location information provided by the positioning system 222, tracking device information, physical environment information, subject information, and/or any other information that would be apparent to one of skill in the art in possession of the present disclosure. The tracking device 102 may receive tracking device instructions in response to sending the emergency signal. The tracking device instructions may be processed by the tracking engine 208 and causes the tracking device 102 to perform an action according to rescue protocol that is associated with the emergency signal provided to the control system 116.

The method 600 may then proceed to block 608 where it is determined whether the link between the tracking device and control system is lost. In an embodiment, at block 608, the tracking engine 208 may determine whether the link between the tracking device 102 and the control system 116 is lost. For example, if the tracking engine 208 does not receive an acknowledgement in response to a signal such as the emergency signal and/or an alive signal as discussed in block 612 below, the tracking engine 208 may determine that the link between the tracking device 102 and the control system 116 is lost and the method 600 may proceed to block 614, discussed below. If the tracking engine 208 does receive the acknowledgement in response to the signal sent by the tracking device 102 such as, for example, an emergency signal and/or an alive signal, then the method 600 may proceed back to decision block 604 to determine whether another emergency condition is detected.

If, at decision block 604, no emergency condition is detected, the method 600 may proceed to block 610 where it is determined whether a time period has completed. In an embodiment, at block 610, the tracking engine 208 may maintain a timer/clock. The time period may be 5 minutes, 10 minutes, 15 minutes, 20 minutes, and/or any other predetermined time period that would be apparent to one of skill in the art in possession of the present disclosure. In various embodiments, when the tracking device 102 receives tracking instructions from the control system 116, the tracking instructions may include instructions to change the time period. For example, if the tracking device 102 is in the zone 104a, the time period may be 15 minutes. However, if the tracking device 102 is in zone 104b, the tracking device 102 may have received tracking device instructions and/or performed instructions that changes the time period to 10 minutes.

When the time period has completed, the method 600 proceeds to block 612, where an alive signal is provided to the control system via the wireless link. In an embodiment, at block 612, the tracking engine 208 may generate and send via the communication interface 214 an alive signal. The alive signal may include location information such as that obtained by the positioning system 222. In various embodiments, the positioning system 222 may obtain location information just prior to the alive signal being sent via the communication interface 214 so that if the control system 116 receives the alive signal that includes the location information, the control system 116 may have an accurate location of the tracking device 102 at the time when the tracking device 102 sent the alive signal. However, the positioning system 222 may determine location information at any time during the time period between alive signals. The alive signal may also include tracking device information (e.g., a tracking device identifier, sensor information, etc.), subject information, environmental information, and/or any other information that would be apparent to one of skill in the art in possession of the present disclosure. The tracking device 102 may receive tracking device instructions and/or an acknowledgement signal in response to sending the alive signal. The tracking device instructions may be processed by the tracking engine 208 and causes the tracking device 102 to perform an action according to those tracking device instructions that are associated with a rescue protocol that is associated location information and/or other information in the alive signal that is provided to the control system 116.

The method 600 may then proceed to block 608 where it is determined whether the wireless link between the tracking device and control system is lost. In an embodiment, at block 608, the tracking engine 208 may determine whether the wireless link between the tracking device 102 and the control system 116 is lost. For example, if the tracking engine 208 does not receive an acknowledgement in response to the alive signal, the tracking engine 208 may determine that the link between the tracking device 102 and the control system 116 is lost and the method 600 may proceed to block 614 where the tracking device enters a lost mode. In an embodiment, at block 614, the tracking engine 208 may enter the lost mode and operate the components of the tracking engine 208 according to instructions associated with the lost mode. For example, the tracking engine 208, while in the lost mode, may monitor the power supply system 218. If a capacity of the primary power supply 218*a* satisfies a condition (e.g., 10% battery capacity or lower), then the tracking engine 208 may switch to the backup power supply 218*b*. In various embodiments, the backup power supply 218*b* may only be activated when the primary power supply 218*a* satisfies the condition and the tracking device 102 is in lost mode (e.g., being out of communication range with the control system 116). By only activating the backup power supply 218*b* when the primary power supply 218*a* satisfies the condition and the tracking device 102 is in lost mode, the tracking device 102 includes a safeguard such that if the tracking device 102 is out of communication range with the control system 116, operation time for the tracking device 102 is extended, giving the rescuer 138 more time to locate the tracking device 102. To save additional power while in lost mode, the tracking engine 208 may disable one or more of the sensors included in the sensor system 224 and/or disable one or more of the components of the user I/O system 228. As such, the emergency signal function may be disabled during lost mode.

Figure 10A:
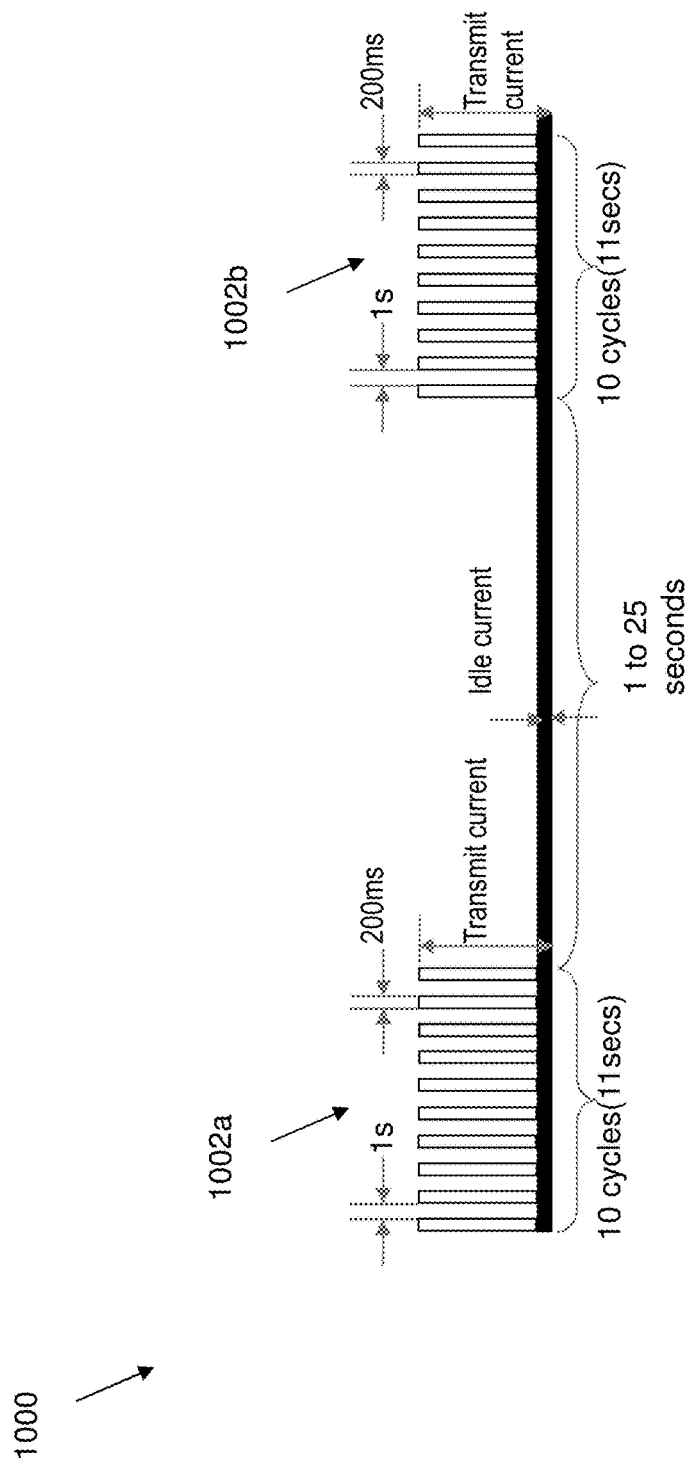
FIG. 10A is a beacon signal graph illustrating an embodiment of beacon signals provided by the tracking device used in the track and locate system of FIG. 1.

In various embodiments, when the tracking device 102 enters the lost mode, the tracking device 208 may activate the communication interface 216 to provide beacon signals (e.g., analog radio signals) that may be the benefits relative to the alive signals provided by the communication interface 214, as discussed above. Referring to FIG. 10A, an embodiment of a beacon signal pattern 1000 is provided by the communication interface 216 is illustrated. In an embodiment, a beacon signal 1002*a* is provided. The beacons signal 1002*a* includes 10 cycles that are 1.1 secs long where each pulse has a pulse width of 200 msec and a transmission current of 15 mA and the different width between pulses may be 1 second. A beacon signal 1002*b* may be provided subsequent the beacon signal 1002*a*. As illustrated in FIG. 10A, the beacons signal 1002*b* may be provided 25 seconds subsequent the beacon signal 1002*a*. An idle current may be 2.7 mA. While a specific beacon signal pattern is illustrated in FIG. 10A, one of skill in the art will recognize that each beacon signal 1002*a* and/or 1002*b* may have more or fewer cycles that have greater or lesser amplitude, greater or lesser pulse width, greater or lesser different width and a greater or lesser interval between beacon signals and still fall under the scope of the present disclosure. For example, the interval between the first beacons signal 1002*a* and the second beacon signal 1002*b* can be varied between 1 to 25 seconds. This means there is no idle duration between the first beacons signal 1002*a* and the second beacon signal 1002*b* in the case of 1 second.

Figure 10B:
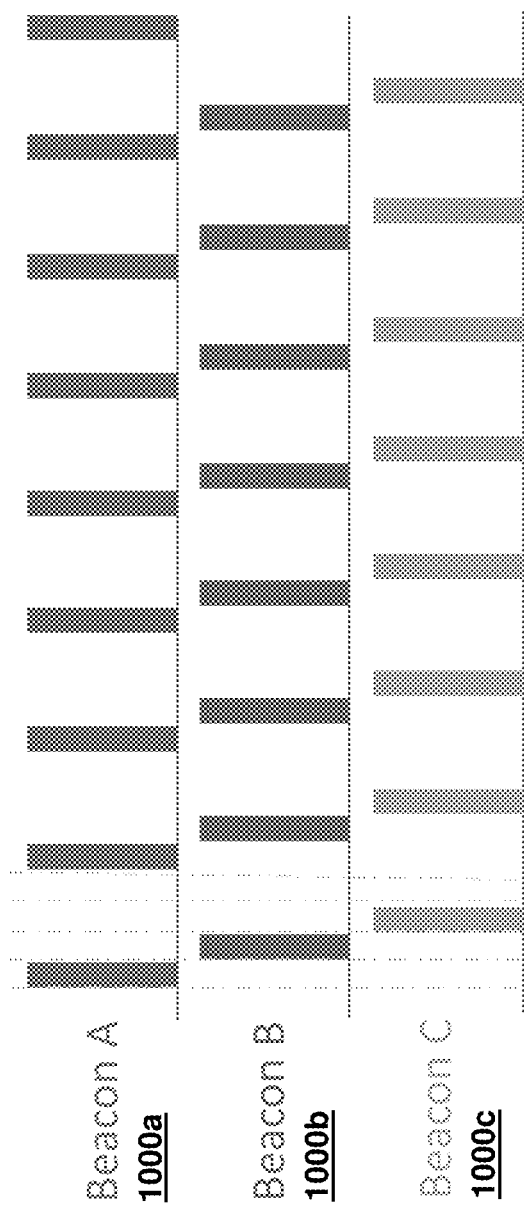
FIG. 10B is a beacon signal graph illustrating an embodiment of beacon signals provided by multiple tracking devices used in the track and locate system of FIG. 1.

In various embodiments as illustrated in FIG. 10B, tracking of multiple beacon signals patterns (e.g., beacon signal patterns 1000*a*, 1000*b*, and 1000*c*) is possible if each tracking device deploys a Listen Before Talk (LBT) protocol. Each tracking device may transmit beacon signal patterns at different time slots or different frequency channels. To simplify the scanning process by the receiver devices 126*a* and/or 126*b*, the frequency channels may be a fixed channel randomly allocated to each tracking device upon registration. If occupancy is detected on a particular channel when the tracking device wants to transmit, it will attempt again at another time slot. Multiple rescuers have the flexibility to select which tracking device to work on should multiple tracking devices be found in lost mode.

In various embodiments, when the tracking device 102 enters the lost mode, the tracking device 208 may transmit alive signals (e.g., the LoRa signals) periodically via the communication interface 214. The time period at which the tracking engine 208 transmits the alive signals may be different than when the tracking device 102 is within zones 104*a*, 104*b*, and/or 104*c*. However, in other embodiments the time period may be the same. For example, the time period between the alive signals when the tracking device 102 is in the lost mode may be 15 minutes or any other time period that would be apparent to one of skill in the art in possession of the present disclosure. The alive signal may include at least a tracking device identifier such that any receiver device (e.g., the receiver device 126*a* and/or 126*b*) will know that the receiver device located the correct tracking device when the alive signal is received.

In some embodiments, the alive signals may include a geographical coordinate obtained from the positioning system 222. The obtaining of the geographical coordinate via the positioning system 222 may be performed just prior to the transmission of the alive signal such that an accurate geographical coordinate is provided in the alive signal. However, the obtaining of the geographical coordinate via the positioning system 222 may be at a time period that is different than the time period of the transmission of the alive signals. For example, the time period at which the geographical coordinate is obtained via the positioning system 222 may be every 30 minutes. Thus, the geographical coordinate may be provided in every other alive signal if those alive signals are sent every 15 minutes. The positioning system 222 may be a power intensive component of the tracking device 102, and thus increasing the time period at which geographical coordinates are obtained may increase a length of time that the tracking device 102 is operational. In yet other embodiments, the geographical coordinates may not be obtained during the lost mode to conserve power or may be unobtainable (e.g., due to the tracking device 102 being in a physical environment where a GPS signal cannot be obtained), and thus the alive signal may not include location information. In yet other embodiments, the time period of acquisition of GPS coordinates shall be equal to or more frequent than the alive signal intervals. This means the tracking device 102 will deploy a fast acquisition positioning system 222 to determine the location upon every wake up of the tracking device 102. Upon the first power up or cold start, the positioning system 222 may take a relatively longer time (e.g. 30 s) to track the satellites. Once the first acquisition is made, the positioning system 222 can make use of a preloaded almanac or ephemeris data in its memory to speed up the next acquisition during next wake up or warm start. Whilst battery capacity is still ample, the tracking device 102 in lost mode may also adjust the interval of alive signals by reviewing the travelling speed and direction of the tracking device 102. If the subject 112 that is associated with the tracking device 102 moves away at a fair speed in a certain direction, the intervals can follow predetermined values. If subject 112 moves away or changes course quickly, the intervals may be shortened to broadcast the subject's location more frequently. In yet other embodiments, the alive signal may include other tracking device information, subject information, and/or physical environment information that would be apparent to one of skill in the art in possession of the present disclosure.

The method 600 then proceeds to decision block 616 where it is determined whether a wireless link is established with a receiver device. In an embodiment, at decision block 616, the tracking engine 208 may continue to provide beacon signals via the communication interface 216 and provide alive signals via the communication interface 214 according to the instructions for lost mode until a wireless link is established with a receiver device 126*a* and/or 126*b*. The establishment of a wireless link between the receiver device 126*a* and/or 126*b* and the tracking device 102 may be when the tracking device 102 receives an acknowledgement to an alive signal.

If a link is established, the method 600 proceeds to block 618 where the tracking device enters a receiver mode. In an embodiment, at block 618, the tracking engine 208 may have received an acknowledgement from the receiver device 126*a* and/or 126*b* that establishes the wireless link. The tracking engine 208 may enter a receiver mode and operate the components of the tracking device 102 according to instructions associated with the receiver mode.

In various embodiments, when the tracking device 102 enters the receiver mode, the tracking engine 208 may transmit alive signals (e.g., the LoRa signals) periodically via the communication interface 214. The time period at which the tracking engine 208 transmits the alive signals may be different than when the tracking device 102 was in the lost mode. However, in other embodiments the time period may be the same. For example, the time period between the alive signals when the tracking device 102 is in the receiver mode may be 5 minutes or any other time period that would be apparent to one of skill in the art in possession of the present disclosure. The time period between alive signals in the receiver mode may be less so that accurate location information may be obtained by the receiver device 126*a* and/or 126*b* while the tracking device 102 is in receiver mode. The alive signal may include at least a tracking device identifier such that any receiver device receiving the alive signal will know that the receiver device is communicating with the same tracking device 102 when the alive signal is received. As such, the receiver device 126*a* and/or 126*b* may communicate with a plurality of tracking devices.

In some embodiments, the alive signals may include a geographical coordinate obtained from the positioning system 222. The obtaining of the geographical coordinate may be performed just prior to the transmission of each alive signal such that an accurate geographical coordinate is provided in each alive signal. However, the obtaining of the geographical coordinate via the positioning system 222 may be at period that is different than the period of the transmission of the alive signals. Thus, the geographical coordinate may be provided in every alive signal if those alive signals are sent every 5 minutes. In yet other embodiments, the geographical coordinates may not be obtained during the receiver mode because the geographical coordinates may be unobtainable (e.g., due to the tracking device 102 being in a physical environment where a GPS signal cannot be obtained) via the positioning system 222, and thus the alive signal may not include location information. In yet other embodiments, the alive signal may include other tracking device information, subject information, and/or physical environment information that would be apparent to one of skill in the art.

When switching from the lost mode to the receiver mode, the tracking engine 208 may end the beacon signal transmissions through the communication interface 216 to conserve power. However, in other embodiments, the beacon signal may remain active during the receiver mode. In yet other embodiments, the beacon signal may remain active or may be activated by the tracking engine 208 if it is determined that the geographical coordinates cannot be obtained by the positioning system 222 during the receiver mode. For example, if the subject 112 moves under a bridge, in a cave, in a building, and/or other location where the positioning system 222 cannot communicate with global positioning system satellites, then the tracking engine 208 may turn on the beacon signal via the communication interface 216 until the geographical coordinates via the positioning system 222 are available again. As such, the tracking engine 208 may end the transmission of the beacon signal once the geographical coordinates are available via the positioning system 222.

In various embodiment during the receiver mode, the tracking device 102 may receive tracking device instructions from the receiver device 126*a* and/or 126*b*. For example, the tracking device instructions may include one or more of the instructions for the receiver mode as discussed above (e.g., a time period at which the alive signal is transmitted, a time period at which the geographical coordinates are obtained, turning on and of the beacon signal, and/or other instructions discussed above and that would be apparent to one of skill in the art in possession of the present disclosure). The tracking device 102 may remain in the receiver mode until the rescuer 138 locates the tracking device 102, until the wireless link between the tracking device 102 and the receiver device 126*a* and/or 126*b* is lost, and/or until a wireless link is established between the tracking device 102 and the control system 116.

Figure 7:
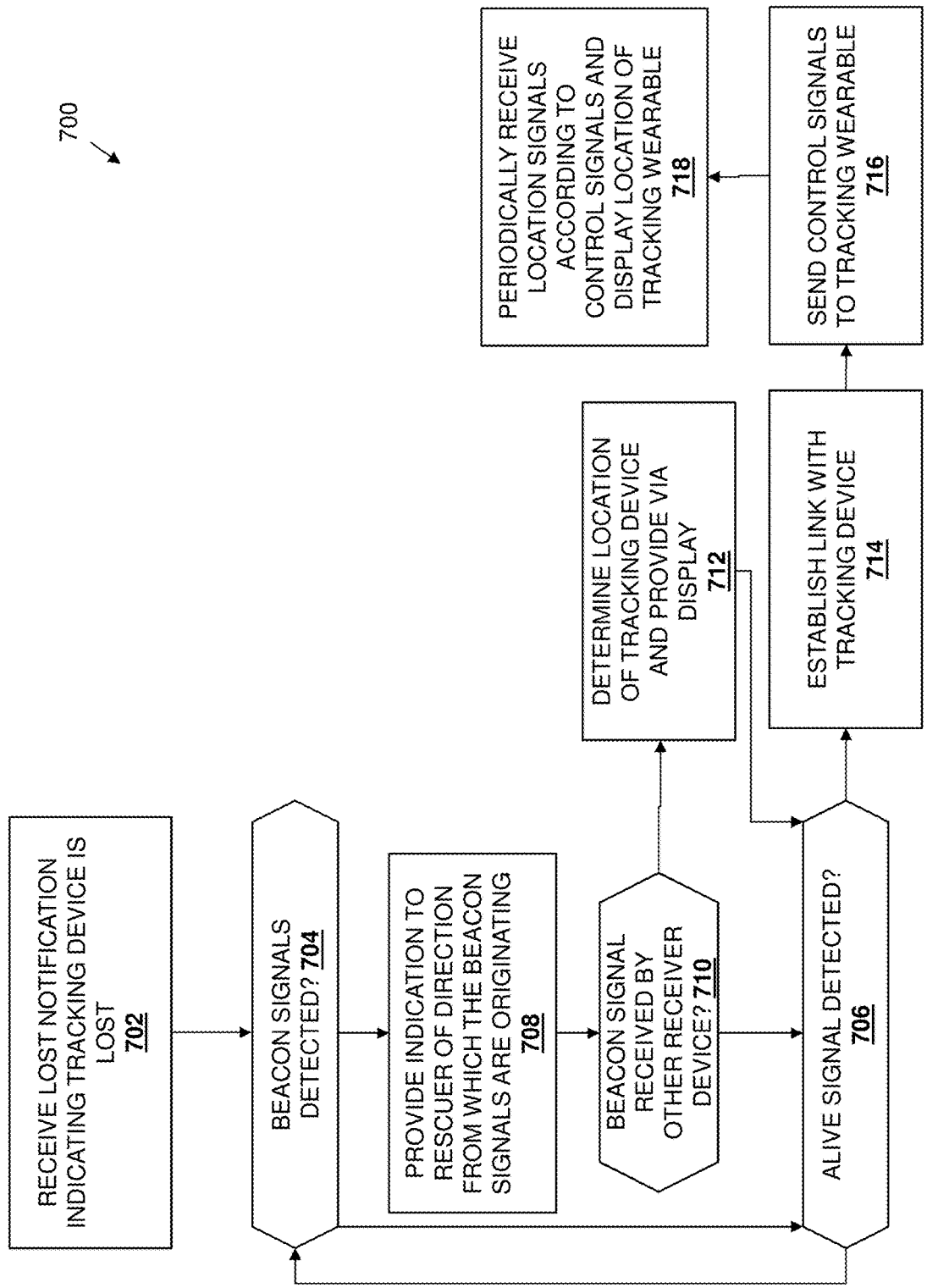
FIG. 7 is a flow chart illustrating an embodiment of a method of track and locate performed by the receiver device of FIG. 3.

Referring now to FIG. 7, an embodiment of a method 700 of track and locate by a receiver device is illustrated. The method 700 will be discussed in reference to the FIGS. 1-4 above. The method 700 begins at block 702 where a lost notification is received indicating that a tracking device is lost. In an embodiment, at block 702, the receiver engine 304 may receive via the communication interface 310, 314, and/or 316, a lost notification from the control system 116 that indicates that a link between the tracking device 102 and the control system 116 has been lost. For example, if the control system 116 cannot detect the tracking device 102 within two periods, then the control system 116 will transmit the lost notification to the receiver device 126*a* associated with the vehicular device 136 and/or to the receiver device 126*b* associated with the rescuer 138 to locate the tracking device 102 as the lost notification indicates that the tracking device 102 is out of range of the wireless communication signal 108*a*.

The lost notification may include receiver device instructions. The receiver device instructions may include instructions that cause the receiver device 126*a* and/or 126*b* to activate at least the communication interface 310 and the communication interface 312 to be able to receive communications from the tracking device 102 that should be providing alive signals that the tracking device 102 provides to the antenna 108 via the communication interface 214 and beacon signals that the tracking device 102 provides via the communication interface 216 when the communication interface 214 is no longer in range of the wireless communication signal 108*a* that is provided by the antenna 108. The receiver instructions may also include activating the communication interface 314 and/or the communication interface 316 such that the receiver device 126*a* and/or 126*b* can communicate with another receiver device, each other, the user device 124, and/or the network 122. The receiver device instruction may include a last known location of the tracking device 102 such that the vehicular device 136 can move the receiver device 126*a* and/or the rescuer 138 can move the receiver device 126*b* to that location to determine whether the receiver device 126*a* and/or 126*b* can detect the tracking device 102 from the location the tracking device was last known to be. In other examples, the receiver device instructions may include the last two known locations of the tracking device 102 such that the receiver device 126*a* and/or 126*b* can estimate a direction in which the tracking device 102 may have been moving. The receiver device instructions may include tracking device information, subject information, and/or any other information that is associated with the tracking device 102 that may help the rescuer 138 and/or the vehicular device 136 locate the tracking device 102.

The method 700 then proceeds to decision block 704, where it is determined whether any beacon signals are detected. In an embodiment, at decision block 704, the receiver engine 304 may determine whether the communication interface 312 has detected any beacon signals provided by the tracking device 102. In an embodiment, the rescuer 138 and/or the vehicular device 136 may have relocated to the last known location of the tracking device 102 and rotated the antenna included in the communication interface 312 of the receiver device 126*a* and/or 126*b* to search for a maximum beacon signal to determine whether any beacon signals are detectable.

If, at decision block 704, no beacon signal is received, the method 700 may proceed to decision block 706 where it is determined whether an alive signal has been received. In an embodiment, at decision block 706, the receiver engine 304 may determine whether the communication interface 310 has detected any alive signals provided by the tracking device 102. As discussed above, the alive signals may be provided by LoRa modulation. If no alive signals are detected, the vehicular device 136 may move the receiver device 126*a* in a direction from the last known location of the tracking device 102 to attempt to detect a beacon signal and/or an alive signal. Similarly, the rescuer 138 may move the receiver device 126*b* in direction from the last known location of the tracking device 102 to attempt to detect a beacon signal and/or an alive signal. The direction in which at least one of the receiver devices 126*a* and 126*b* may move is a direction indicated by the last two known locations obtained by the control system 116. However, the rescuer 138 and/or vehicular device 136 may move out in various directions that are outside of the zones 104*a*-104*c* and within zone 104*d*. The method 700 may loop through decision blocks 704 and 706 until at least one of the receiver devices 126*a* and 126*b* detect at least one of the beacon signal and the alive signal.

If at decision block 704 a beacon signal is received, then the method 700 may proceed to block 708 where an indication of a direction from which the beacon signal is originating is provided. In an embodiment, at block 708, the receiver engine 304 may receive beacon signals via the communication interface 312. When the receiver engine 304 detects beacon signals and the receiver engine 304 is included in the receiver device 126*b*, the receiver engine 304 may provide, via the display system 326 and/or other user output device, an indication that a beacon signal has been received. When the receiver engine 304 detects the beacon signal and the receiver engine 304 is included in the receiver device 126*a*, the receiver engine 304 may provide an indication that a beacon signal has been received to the vehicular device 136. The rescuer 138 associated with the receiver device 126*b* or the vehicular device 136 associated with the receiver device 126*a* may rotate the antenna included in the communication interface 312 such that the receiver engine 304 can analyze the beacon signal and determine a direction from which the beacon signal originated. When the receiver engine 304 is included in the receiver device 126*b*, the receiver engine 304 may provide, via the display system 326 and/or other user output device, to the rescuer 138 a direction in which the rescuer 138 should proceed, a signal strength (e.g., a Received Signal Strength Indicator (RSSI) value), and/or any other signal information that would be apparent to one of skill in the art in possession of the present disclosure. When the receiver engine 304 is included in the receiver device 126*a*, the receiver engine 304 may provide a direction in which the vehicular device 136 should proceed, a signal strength (e.g., the RSSI value), and/or any other signal information that would be apparent to one of skill in the art in possession of the present disclosure. In other embodiments when the receiver engine 304 is included in the receiver device 126*a*, the receiver device 126*a* may provide through the network 122 or through a direct communication channel with a vehicular device control unit (e.g., the user device 124 that includes a display device and that operates the vehicular device 136) the signal information associated with the beacon signal received such that an operator of the vehicular device 136 may know which direction the beacon signal is originating from in relation to the vehicular device 136.

In various embodiments, the receiver device 126*a* and/or 126*b* may send a detection indication to the other receiver devices that are searching for tracking device 102 when the receiver device 126*a* and/or 126*b* detects a beacon signal. The detection indication may include the geographical coordinates of the receiver device that detected the beacon signal, direction the beacon signal originated from the receiver device that detected the beacon signal, and/or any other signal information associated with the beacon signal. For example, if the receiver device 126*a* detected a beacon signal, the receiver device 126*a* may transmit the detection indication to the receiver device 126*b* via the communication interface 314 and/or 316, the detection indication may include geographical coordinates of the receiver device 126*a* that were captured by the positioning system 320 of the receiver device 126*a* when the beacon signal was detected. The detection indication may alert the other rescuers or other vehicular devices searching for the tracking device 102 in the track and locate system 100 as to a more accurate vicinity in which the tracking device 102 may be located.

The method 700 may then proceed to decision block 710 where it is determined whether any other receiver device captured the beacon signal. In an embodiment, at decision block 710, the receiver engine 304 may monitor for detection indications sent from other receiver devices in the track and locate system 100. Continuing with the example above, the receiver device 126*a* that detected the beacon signal may monitor for detection indications from the receiver device 126*b* or other receiver devices that are searching for the tracking device 102.

If a detection indication is received, the method 700 may proceed to block 712 where a location of the tracking device is determined. In an embodiment, at block 712, the receiver engine 304 may determine the location of the tracking device 102 using the detection indication provided by another receiver device and using the beacon signal that the receiver engine 304 detected. For example, the receiver device 126*a* may receive a detection indication from the receiver device 126*b* that includes the geographical coordinates of the receiver device 126*b* and the directional information that indicates the direction from those geographical coordinates to the tracking device 102. The receiver device 126*a* may use the direction information and the geographical coordinates received from the receiver device 126*b* along with directional information and geographical coordinates that receiver device 126a calculated based on a beacon signal the receiver device 126a detected, to determine an approximate location of the tracking device 102 using the intersection of the directions determined by both the receiver devices 126a and 126b and the distance between the two receiver devices 126a and 126b determined from the geographical coordinates of the receiver device 126a and 126b. In other embodiments, the detection indication may include timing information that includes a time at which the beacon signal was received and the receiver devices 126a and 126b may have synchronized clocks such that distances can be determined between the receiver devices 126a and/or 126b and the tracking device 102 at a given time. This information may be used to determine an approximate location of the tracking device 102 using trigonometric functions.

In other examples, trilateration may be used to determine the location of the tracking device 102. When the beacon signal is detected, the receiver device 126a and/or 126b converts the signal strength into distance or radius of a circle which bounds the location of the tracking device 102. When three receiver devices at three different locations detect the beacon signal at the same time, three circles can be derived and the intersection of the circles positions the lost person/item. However, trilateration requires a reliable RSSI to Distance modelling for the conversion. Differences of environmental factors in urban or rural regions will affect the propagation of radio signals and result in very fluctuating RSSI values even though the subject 112 is not moving. Also, if there is only one rescuer available, one has to move to three physically distant locations one by one.

In other examples, triangulation may be used to determine the location of the tracking device 102. Each receiver device 126a and/or 126b is equipped with a uni-directional antenna which gives the highest RSSI reading when pointed to the correct direction. Although RSSI can be affected by environmental factors, it is better than trilateration because triangulation operates on RSSI values without the need of further conversion, which may introduce more errors, and triangulation provides better efficiency compared to trilateration if there is only one rescuer since the uni-directional antenna has higher gain and can detect the right direction more easily than trilateration.

While specific examples of using the received beacon signals from one or more receiver devices are described, one of skill in the art will recognize other techniques for determining location of the tracking device 102 based on a beacon signal provided by that tracking device 102 will fall under the scope of the present disclosure (e.g., other triangulation techniques).

The receiver device 126a may provide the location information to the vehicular device 136 to cause the vehicular device 136 to navigate toward the location identified in the location information. Similarly, the receiver device 126b may provide an indication of the location via the display system 326 to the rescuer 138. The rescuer 138 and/or the vehicular device 136 may move toward the location of the tracking device 102 determined from the beacon signal.

If at decision block 710 the beacon signal is not received by other receiver devices or following block 712, then the method 700 may proceed to decision block 706 where it is determined whether an alive signal is detected. In an embodiment, at decision block 706, the receiver device 126a and/or 126b may be moving closer to the tracking device 102 based on information gleaned from the beacon signal (e.g., direction and/or an approximate location). The receiver engine 304 may determine whether the communication interface 312 has detected any alive signals provided by the tracking device 102 as the receiver device 126a and/or 126b are moving or stationary in the physical environment 104. If the receiver engine 304 determines that an alive signal has been detected, then the method 700 may proceed to block 714 where a link is established with the tracking device. In an embodiment, at block 714, the receiver engine 304 may transmit an acknowledgement to the tracking device 102, which establishes the link between the tracking device 102 and the receiver engine 304. The receiver engine 304 may provide any location information provided in the alive signal to the user I/O system 324 (e.g., the display system 326) for the rescuer 138 to view and navigate toward. Similarly, if the receiver engine 304 is provided in the receiver device 126a, the receiver engine 304 may provide the location information provided in the alive signal to a navigation system included in the vehicular device 136 to cause the vehicular device 136 to navigate toward the location.

The method 700 may then proceed to block 716 where tracking device instructions are provided to the tracking device. In an embodiment, at block 716 and as discussed above, the acknowledgement sent by the receiver engine 304 may cause the tracking device 102 to enter a receiver mode. The acknowledgement or subsequent signal from the receiver device 126a and/or 126b may include tracking device instructions to change parameters, settings, and/or operations. For example, the tracking device instructions may include decreasing the time period at which the tracking device 102 provides alive signals. The tracking device instructions may include decreasing the time period at which the tracking device 102 obtains geographic coordinates via the positioning system 222 and transmits those geographic coordinates. The tracking device instructions may include instructions to stop transmitting the beacon signal. However, in other examples, the tracking device instructions may include instructions that cause the tracking device 102 to activate the beacon signal when the alive signals are not providing geographic coordinates of the tracking device 102. The method 700 may be repeated until the vehicular device 136 and/or the rescuer 138 locate the tracking device 102, which may include locating the subject 112 that is associated with the tracking device 102.

Figure 11:
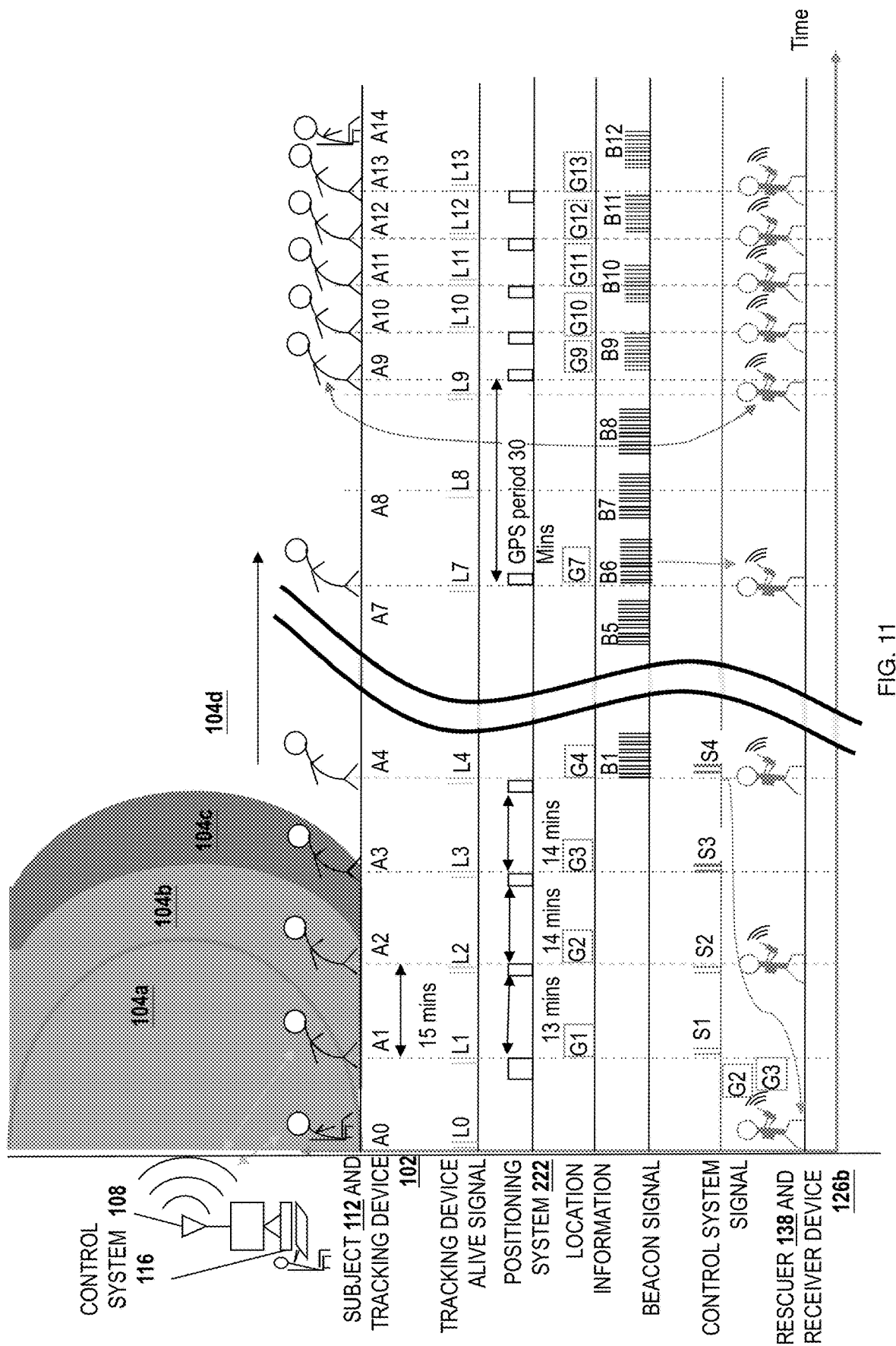
FIG. 11 is a timing diagram illustrating embodiments of the track and locate system during the methods of FIGS. 5-7.

Referring to the timing diagram in FIG. 11, the tracking device 102 and the subject 112, at time A0, may be in the predefined zone (e.g., zone 104a) and the tracking device 102 may provide an initial signal (L0) to the control system 116. The control system 116 may create a tracking device table entry 910a in the tracking device table 408a for the tracking device 102. At time A1, the tracking device 102 and associated subject 112 may move to a new location that is in zone 104b. The control system 116 receives the alive signal L1 that may include a location (e.g., geographical coordinates "G1"). Because the control system 116 detects the tracking device 102 in zone 104b, the control system 116 may issue a signal S1, which may include the instructions associated with the rescue protocol for tracking devices 102 that are within the zone 104b. At time A2, the tracking device 102 and associated subject 112 may move to a new location that is in zone 104b. The control system 116 receives the alive signal L2 that may include a location (e.g., geographical coordinates "G2"). Because the control system 116 detects the tracking device 102 in zone 104b, the control system 116 may issue a signal S2, which may include the instructions associated with the rescue protocol for tracking devices 102 that are within the zone 104b. In a non-illustrated example, at time A2, the tracking device 102 may move back to zone 104a. As a result, the control system 116 may receive the alive signal L2 that may include a location is within zone 104a. Because the control system 116 detects the tracking device 102 in zone 104a, the control system 116 may provide the signal S2 that includes instructions to revert the track and locate system 100 to operate according to when the tracking device 102 is in zone 104a. However, in other embodiments, the tracking device 102 may include instructions that adjusts the interval of the alive signal on its own. In another non-illustrated example, at time A2, the tracking device 102 may send an emergency signal. As a result, the control system 116 may receive the signal alive L2 that includes the emergency signal and that may include a location of the tracking device 102 in zone 104a. The control system 116 may provide the signal S2, which may include the instructions associated with the rescue protocol for tracking devices 102 that is associated with the emergency signal.

At time A3, the tracking device 102 and associated subject 112 may move to a location that is in the zone 104c. The control system 116 receives the alive signal L3 that may include a location (e.g., geographical coordinates "G3"). Because the control system 116 detects the tracking device 102 in zone 104c, the control system 116 may issue a signal S3, which may include the instructions associated with the rescue protocol for tracking devices 102 that are within the zone 104c. At time A4, the tracking device 102 and associated subject 112 may move to a location that is in zone 104d. As a result, the control system 116 does not receive the alive signal L4 transmitted by the tracking device 102 and the tracking device 102 does not receive an acknowledgement from the control system 116. Because the control system 116 does not detect the tracking device 102 within a predetermined time period, the control system 116 may issue a signal S4, which may include the instructions associated with the rescue protocol for tracking devices 102 that are unavailable and presumed to be in zone 104d. As illustrated, the signal S4 may be provided to the receiver device 126b such that a notification is presented to the rescuer 138 and the last two known locations (e.g., G2 and G3) are provided to the receiver device 126b. The receiver device 126b may activate the communication interface 310 that can receive the alive signals provided from the tracking device 102 to the control system 116 (e.g., LoRa signals) and activate the communication interface 312 that can receive beacon signals. The rescuer 138 may move the receiver device 126b out to the last known location of the tracking device 102 (e.g., G3). The receiver device 126b may determine whether any beacon signals and/or alive signals are detected from the tracking device 102.

Also, at time A4, the tracking device 102 does not detect an acknowledgement from the control system 116 and may enter a lost mode and begin transmitting beacon signals (e.g., beacon signal B1). The tracking device 102 may transmit the beacon signals more frequently than the tracking device 102 transmits the alive signal. During times A4-A9, the tracking device 102 may be transmitting an alive signal L4-L9 at each time period. The alive signals L4-L9 may or may not include location information such as geographical coordinates. As illustrated in FIG. 9, the positioning system 222 of the tracking device obtains the geographical coordinates for every other time period that the alive signals are being sent. For example, alive signal L7 incudes the geographic coordinates G7 and alive signal L9 includes the geographic coordinates G9 but the alive signal L8 does not include geographic coordinates or other location information.

In the illustrated example, at time A7 the receiver device 126b may detect the beacon signal B6, determine a direction from which the beacon signal is originating, and provide that direction to the rescuer 138 via a user I/O system 324 (e.g., the display system 326). In other examples, the receiver device 126b may coordinate via the network 122 or via direct communication links with other receiver devices to determine an approximate location based on received beacon signals or share direction and location information with other receiver devices in the track and locate system 100. The rescuer 138 may move the receiver device 126b closer to the tracking device 102 until the receiver device detects an alive signal at time A9. The receiver device 126b may send an acknowledgement and establish a link with the tracking device 102. The acknowledgement may include tracking device instructions, or cause the tracking device 102 to execute tracking device instructions that put the tracking device 102 into a receiver mode. The receiver mode may cause the tracking device 102 to provide the alive signals more frequently such as illustrated for alive signals L9-L13. The receiver mode may cause the tracking device 102 to provide the location information more frequently such as illustrated for alive signals G8-G12. In some embodiments, if the location information is not available, then the tracking device 102 may continue to transmit beacon signals (e.g., beacon signals B9-B12). At times A9-A12, the rescuer 138 may catch up to the location of the tracking device 102. At time A13, the tracking device 102 may be found by the rescuer 138 using the receiver device 126b and in some embodiments, the subject 112 associated with the tracking device 102 may be found as well.

Figure 12:
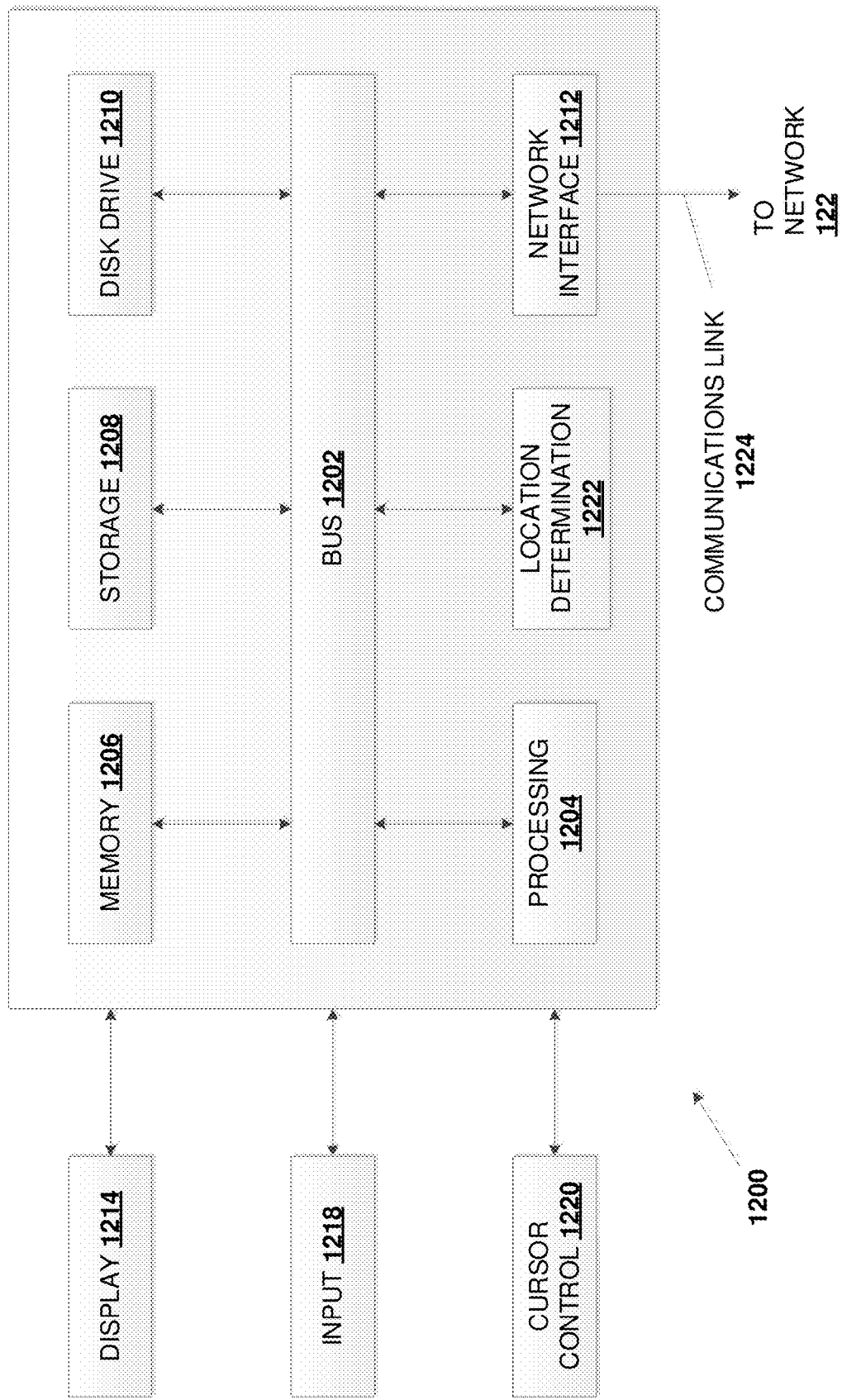
FIG. 12 is a schematic view illustrating an embodiment of a computer system.

Referring now to FIG. 12, an embodiment of a computer system 1200 suitable for implementing, for example, the tracking device 102 and 200, the control system 116 and 400, the gateway 114, the receiver device 126a, 126b, and 300, and the user device 124, is illustrated. It should be appreciated that other devices utilized in the track and locate system 100 discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and/or a location determination component 1222 (e.g., a Global Positioning System (GPS) device as illustrated, a cell tower triangulation device, and/or a variety of other location determination devices.) In one implementation, the disk drive component 1210 may comprise a database having one or more disk drive components.

In accordance with embodiments of the present disclosure, the computer system 1200 performs specific operations by the processing component 1204 executing one or more sequences of instructions contained in the system memory component 1206, such as described herein with respect to the tracking device(s), the user device(s), the control system(s), the receiver device(s), the vehicular device(s) and. Such instructions may be read into the system memory component 1206 from another computer-readable medium, such as the static storage component 1208 or the disk drive component 1210. In other embodiments, hardwired circuitry may be used in place of or in combination with software instructions to implement the present disclosure.

Logic may be encoded in a computer-readable medium, which may refer to any medium that participates in providing instructions to the processing component 1204 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 1210, volatile media includes dynamic memory, such as the system memory component 1206, and tangible media employed incident to a transmission includes coaxial cables, copper wire, and fiber optics, including wires that comprise the bus 1202 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the various networks (e.g., the network 122, wireless communication signal 108a, and/or other LANs, WLANs, PTSNs, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (e.g., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A tracking device for a track and rescue system, comprising:
    a communication system that includes a tracking device first type wireless communication interface and a tracking device second type wireless communication interface;
    a positioning system;
    a processing system that is coupled to the communication system and the positioning system;
    a power supply electrically coupled to the communication system, the positioning system, and the processing system and that includes a primary battery and a backup battery; and
    a memory system that is coupled to the processing system and the power supply and that includes instructions that, when executed by the processing system, cause the processing system to provide a tracking engine that is configured to:
        wirelessly couple to a control system via a first link established between a control system first type wireless communication interface coupled to the control system and the tracking device first type wireless communication interface when the tracking device first type wireless communication interface is within range of the control system first type wireless communication interface;
        prevent operation of the backup battery when the primary battery has reached a predetermined power level and the first link is established between the control system first type wireless communication interface and the tracking device first type wireless communication interface;
        determine that a first predetermined time period has been satisfied, and in response, determine location information for the tracking device using the positioning system;
        send, in response to the first predetermined time period being satisfied, a first alive signal to the control system via the first link, wherein the first alive signal includes the location information;
        transmit, via the tracking device second type wireless communication interface, beacon signals when no link is established between the control system first type wireless communication interface and the tracking device first type wireless communication interface, wherein the tracking device is in a lost mode when there is no link established between the control system first type wireless communication interface and the tracking device first type wireless communication interface;

operate the backup battery when the primary battery has reached the predetermined power level, while in the lost mode, and while the tracking device first type wireless communication interface has power provided by the primary battery to operate to establish a link;

periodically transmit, while in the lost mode and via the tracking device first type wireless communication interface, a second alive signal;

wirelessly couple to a receiver device via a second link established between the tracking device first type wireless communication interface and a receiver device first type wireless communication interface coupled to the receiver device when the tracking device first type wireless communication interface is within range of the receiver device first type wireless communication interface, wherein the second link causes the tracking device to enter a receiver mode; and cease transmission of the beacon signals while in the receiver mode.

2. The tracking device of claim 1, further comprising:
a sensor system coupled to the processing system, wherein the tracking engine is configured to:
receive sensor information from the sensor system; and
determine that the sensor information satisfies an emergency condition, and in response, send an emergency signal via the first link to the control system.

3. The tracking device of claim 1, wherein the tracking engine is configured to:
receive tracking device instructions form the control system via the first link to operate according to a first rescue protocol; and
operate at least one of the communication system, the positioning system, the processing system, the memory system, or the tracking engine according to the first rescue protocol, wherein the tracking device instructions cause the tracking device to perform operations that are different than operations performed in a default mode that the tracking device was operating in prior to receiving the tracking device instructions.

4. The tracking device of claim 3, wherein the tracking device instructions causes the tracking engine to perform at least one of changing the first predetermined time period to a second predetermined time period, increasing power provided to the communication system, or providing an output via a user input/output (I/O) system included on the tracking device.

5. The tracking device of claim 1, wherein the operating in the receiver mode is in response to receiving tracking device instructions from the receiver device via the second link that causes the tracking device to enter the receiver mode.

6. The tracking device of claim 1, wherein the operating in the receiver mode causes the tracking device to perform operations that are different than operations performed in the lost mode that the tracking device was operating in prior to establishment of the second link.

7. The tracking device of claim 1, further comprising:
a tracking device chassis that is configured to house the power supply, the communication system, the positioning system, the processing system, and the memory system; and a wearable coupling feature coupled to the tracking device chassis that is configured to attach to a subject associated with the tracking device chassis.

8. A method of track and locate, comprising:
wirelessly coupling, by a tracking device, to a control system via a first link established between a control system first type wireless communication interface coupled to the control system and a tracking device first type wireless communication interface included on the tracking device when the tracking device first type wireless communication interface is within range of the control system first type wireless communication interface;

preventing, by the tracking device, operation of a backup battery included in the tracking device, when a primary battery that powers the tracking device has reached a predetermined power level and the first link is established between the control system first type wireless communication interface and the tracking device first type wireless communication interface;

determining, by the tracking device, that a first predetermined time period has been satisfied, and in response, determining location information for the tracking device using a positioning system;

sending, by the tracking device and in response to the first predetermined time period being satisfied, a first alive signal to the control system via the first link, wherein the first alive signal includes the location information;

transmitting, by the tracking device and via a tracking device second type wireless communication interface, beacon signals when no link is established between the control system first type wireless communication interface and the tracking device first type wireless communication interface, wherein the tracking device is in a lost mode when there is no link established between the control system first type wireless communication interface and the tracking device first type wireless communication interface;

operating, by the tracking device, the backup battery when the primary battery has reached the predetermined power level, while the tracking device is in the lost mode, and while the tracking device first type wireless communication interface has power provided by the primary battery to operate to establish a link;

periodically transmitting, by the tracking device while in the lost mode and via the tracking device first type wireless communication interface, a second alive signal;

wirelessly coupling, by the tracking device, to a receiver device via a second link established between the tracking device first type wireless communication interface and a receiver device first type wireless communication interface coupled to the receiver device when the tracking device first type wireless communication interface is within range of the receiver device first type wireless communication interface, wherein the second link causes the tracking device to enter a receiver mode; and ceasing, by the tracking device, transmission of the beacon signals while in the receiver mode.

9. The method of claim 8, further comprising:
receiving, by the tracking device, sensor information from a sensor system; and
determining, by the tracking device, that the sensor information satisfies an emergency condition, and in response, sending an emergency signal via the first link to the control system.

10. The method of claim 8, further comprising:

receiving, by the tracking device, tracking device instructions form the control system via the first link to operate according to a first rescue protocol; and operating, by the tracking device, at least one component included in the tracking device according to the first rescue protocol, wherein the tracking device instructions cause the tracking device to perform operations that are different than operations performed in a default mode that the tracking device was operating in prior to receiving the tracking device instructions.

11. The method of claim 8, further comprising:

performing, by the tracking device, operations only using the primary battery when the first link is established between the control system first type wireless communication interface and the tracking device first type wireless communication interface.

12. The method of claim 8, further comprising:

performing, by the tracking device, an operation according to the receiver mode.

13. The method of claim 8, wherein the beacon signals include analog radio signals.

14. A non-transitory computer-readable medium having stored thereon machine-readable instructions that, when executed by a machine, cause the machine to perform operations comprising:

wirelessly coupling to a control system via a first link established between a control system first type wireless communication interface coupled to the control system and a tracking device first type wireless communication interface included on a tracking device when the tracking device first type wireless communication interface is within range of the control system first type wireless communication interface;

preventing operation of a backup battery included in a power supply that powers the tracking device when a primary battery has reached a predetermined power level and the first link is established between the control system first type wireless communication interface and the tracking device first type wireless communication interface;

determining that a first predetermined time period has been satisfied, and in response, determining location information for the tracking device using a positioning system; and sending, in response to the first predetermined time period being satisfied, a first alive signal to the control system via the first link, wherein the first alive signal includes the location information;

transmitting, via a tracking device second type wireless communication interface, beacon signals when no link is established between the control system first type wireless communication interface and the tracking device first type wireless communication interface, wherein the tracking device is in a lost mode when there is no link established between the control system first type wireless communication interface and the tracking device first type wireless communication interface;

operating the backup battery included in the power supply when the primary battery has reached the predetermined power level, while in the lost mode, and while the tracking device first type wireless communication interface has power provided by the primary battery to operate to establish a link;

periodically transmitting, while in the lost mode and via the tracking device first type wireless communication interface, a second alive signal;

wirelessly coupling to a receiver device via a second link established between the tracking device first type wireless communication interface and a receiver device first type wireless communication interface coupled to the receiver device when the tracking device first type wireless communication interface is within range of the receiver device first type wireless communication interface, wherein the second link causes the tracking device to enter a receiver mode; and ceasing transmission of the beacon signals while in the receiver mode.

\* \* \* \* \*